United States Patent
Raychaudhuri et al.

(10) Patent No.: US 9,617,158 B2
(45) Date of Patent: Apr. 11, 2017

(54) COHESIVE ASSEMBLY OF CARBON AND ITS APPLICATION

(71) Applicant: YAZAKI CORPORATION, Tokyo (JP)

(72) Inventors: Satyabrata Raychaudhuri, Thousand Oaks, CA (US); Yongan Yan, Thousand Oaks, CA (US); Leonid Grigorian, Camarillo, CA (US)

(73) Assignee: YAZAKI CORPORATION, Tokyo (JP)

( * ) Notice: Subject to any disclaimer, the term of this patent is extended or adjusted under 35 U.S.C. 154(b) by 242 days.

(21) Appl. No.: 14/106,364

(22) Filed: Dec. 13, 2013

(65) Prior Publication Data

US 2014/0106257 A1 Apr. 17, 2014

Related U.S. Application Data

(63) Continuation of application No. PCT/US2012/042956, filed on Jun. 18, 2012.

(60) Provisional application No. 61/499,084, filed on Jun. 20, 2011, provisional application No. 61/500,862, filed on Jun. 24, 2011.

(51) Int. Cl.

| | |
|---|---|
| *H01G 11/36* | (2013.01) |
| *C01B 31/02* | (2006.01) |
| *H01G 11/38* | (2013.01) |
| *H01G 11/86* | (2013.01) |
| *H01M 4/04* | (2006.01) |
| *H01M 4/133* | (2010.01) |
| *H01M 4/62* | (2006.01) |
| *H01M 4/86* | (2006.01) |
| *H01M 10/0525* | (2010.01) |
| *H01M 8/0234* | (2016.01) |
| *H01G 9/00* | (2006.01) |
| *H01M 4/66* | (2006.01) |
| *H01M 4/88* | (2006.01) |
| *H01M 4/90* | (2006.01) |
| *B82Y 30/00* | (2011.01) |
| *B82Y 40/00* | (2011.01) |
| *H01G 11/28* | (2013.01) |
| *H01M 4/1393* | (2010.01) |
| *H01G 11/68* | (2013.01) |

(52) U.S. Cl.
CPC .......... *C01B 31/0273* (2013.01); *B82Y 30/00* (2013.01); *B82Y 40/00* (2013.01); *C01B 31/02* (2013.01); *C01B 31/0253* (2013.01); *H01G 9/0036* (2013.01); *H01G 11/36* (2013.01); *H01G 11/38* (2013.01); *H01G 11/86* (2013.01); *H01M 4/0402* (2013.01); *H01M 4/133* (2013.01); *H01M 4/625* (2013.01); *H01M 4/663* (2013.01); *H01M 4/8605* (2013.01); *H01M 4/8878* (2013.01); *H01M 4/9083* (2013.01); *H01M 8/0234* (2013.01); *H01M 10/0525* (2013.01); *H01G 11/28* (2013.01); *H01G 11/68* (2013.01); *H01M 4/0471* (2013.01); *H01M 4/1393* (2013.01); *Y02E 60/13* (2013.01)

(58) Field of Classification Search
CPC ... C01B 31/0273; H01G 11/36; H01G 9/0036
USPC .......................................... 429/521; 423/460
See application file for complete search history.

(56) References Cited

U.S. PATENT DOCUMENTS

| | | | |
|---|---|---|---|
| 6,187,823 | B1 | 2/2001 | Haddon et al. |
| 6,440,598 | B1 | 8/2002 | Fukui et al. |
| 6,783,746 | B1 | 8/2004 | Zhang et al. |
| 6,969,690 | B2 | 11/2005 | Zhou et al. |
| 7,938,987 | B2 | 5/2011 | Grigorian et al. |
| 8,454,924 | B2 | 6/2013 | Grigorian et al. |
| 2001/0010809 | A1 | 8/2001 | Haddon |
| 2002/0172639 | A1 | 11/2002 | Horiuchi et al. |
| 2006/0055303 | A1 | 3/2006 | Liu et al. |
| 2007/0224106 | A1 | 9/2007 | Sakakibara et al. |
| 2008/0049380 | A1 | 2/2008 | Miyahara et al. |
| 2008/0317636 | A1 | 12/2008 | Brahim et al. |
| 2009/0015984 | A1 | 1/2009 | Grigorian et al. |
| 2009/0035555 | A1 | 2/2009 | Brahim et al. |
| 2009/0116170 | A1 | 5/2009 | Liu |
| 2009/0142576 | A1 | 6/2009 | Liu et al. |

(Continued)

FOREIGN PATENT DOCUMENTS

| | | |
|---|---|---|
| JP | 2008-066229 A | 3/2008 |
| JP | 2008/201626 | 9/2008 |

(Continued)

OTHER PUBLICATIONS

International Search Report and Written Opinion of PCT App. No. PCT/US2012/042956 with a mailing date of Feb. 26, 2013.
European Search Report for Application No. 12802036, mailed Apr. 23, 2015.
Oswin, (NL 128453), "Fuel Cell Electrode Produced from an Ion Exchange Resin (Abstract)", Derwent ACC No. 1968-40825Q; Thomson Reuters; 1968, 1 page.

(Continued)

*Primary Examiner* — Edward Cain
(74) *Attorney, Agent, or Firm* — Perkins Coie LLP; Viola T. Kung

(57) ABSTRACT

Cohesive carbon assemblies are prepared by obtaining a carbon starting material in the form of powder, particles, flakes, or loose agglomerates, dispersing the carbon in a selected organic solvent by mechanical mixing and/or sonication, and substantially removing the organic solvent, typically by evaporation, whereby the cohesive assembly of carbon is formed. The method is suitable for preparing free-standing, monolithic assemblies of carbon nanotubes in the form of films, wafers, or discs, having high carbon packing density and low electrical resistivity. The method is suitable for preparing adherent cohesive carbon assemblies on substrates comprising various materials. The assemblies have various potential applications, such as electrodes or current collectors in electrochemical capacitors, fuel cells, and batteries, or as electromagnetic interference shielding materials.

33 Claims, 9 Drawing Sheets

(56) References Cited

U.S. PATENT DOCUMENTS

| | | |
|---|---|---|
| 2010/0130005 A1 | 5/2010 | Lee et al. |
| 2010/0159366 A1 | 6/2010 | Shao-Horn et al. |
| 2011/0020563 A1 | 1/2011 | Jiang et al. |
| 2012/0077080 A1 | 3/2012 | Liu et al. |
| 2012/0295406 A1* | 11/2012 | Numata ............ B82Y 10/00 438/158 |
| 2013/0222975 A1 | 8/2013 | Yan et al. |
| 2014/0106257 A1 | 4/2014 | Raychaudhuri et al. |

FOREIGN PATENT DOCUMENTS

| | | |
|---|---|---|
| JP | 2009-078956 A | 4/2009 |
| JP | 2010-006663 A | 1/2010 |
| JP | 2010123766 A | 6/2010 |
| KR | 10-2006-0092737 | 8/2006 |
| KR | 10-2007-0051979 | 5/2007 |
| WO | 2007053155 A2 | 5/2007 |
| WO | WO 2007/058488 | 5/2007 |
| WO | 2009-093698 A1 | 7/2009 |
| WO | WO 2010/016804 | 2/2010 |

* cited by examiner

COHESIVE ASSEMBLY OF CARBON AND ITS APPLICATION

This application is a continuation of PCT/US2012/042956, filed Jun. 18, 2012; which claims the priority of U.S. Provisional Application Nos. 61/499,084, filed Jun. 20, 2011, and 61/500,862, filed Jun. 24, 2011. The contents of the above-identified applications are incorporated herein by reference in their entireties.

TECHNICAL FIELD

This invention relates to a cohesive assembly of carbon, and to methods for preparing a cohesive assembly of carbon, in which the starting carbon materials, under certain prescribed conditions, self-assemble into a disc, wafer, film, or other object of a desired shape. In preferred embodiments, the carbon assembly prepared by the invented method comprises carbon nanotubes. The prepared assembly shows good mechanical strength and integrity, high carbon packing density, high surface area, and low electrical resistivity, and has various potential applications such as in electrical power storage and electromagnetic interference shielding. The cohesive assembly of carbon is especially useful as an electrode or a current collector for an electrochemical capacitor, fuel cell, or battery.

BACKGROUND

Assemblies of carbon, derived from a variety of carbon sources, have a multitude of current and anticipated commercial, industrial, and high-technology applications. For example, activated charcoal or activated carbon, which is usually in the form of loose powder, particles, or irregular agglomerates, has a variety of uses in filtration and catalyst support. This material has also recently been applied to energy storage applications, as an ionic exchange medium or capacitor electrode material. Graphite in its various forms has numerous uses, for example, as refractory material, in brake linings, and as electrodes in electric arc furnaces. Intercalated graphite and expanded graphite have been studied for use as fire retardants and high temperature applications. These cohesive carbon assemblies have many desirable properties such as resistance to chemical attack, resistance to high temperatures, and high surface area in the case of activated carbon, and electrical conductivity and lubricity in the case of graphite. However, these materials typically require a binder or matrix material to form them into an assembly of a desired shape and size, having good mechanical strength and integrity.

More recently, assemblies of carbon nanotubes (CNTs) in various forms have attracted much attention and are being explored and developed for diverse applications. Such assemblies have been referred to in the literature as "buckypaper" or "buckydiscs". For example, Dharap et al in "Nanotube film based on single-wall carbon nanotubes for strain sensing", *Nanotechnology* 15 (2004), pp. 379-382, investigate the use of isotropic films of randomly oriented CNTs as mechanical strain sensors. Cao et al, in "Random networks and aligned arrays of single-walled carbon nanotubes for electronic device applications," *Nano Research* 1, 4 (2008), pp. 259-272, discuss the use of random networks or aligned arrays of CNTs as thin-film transistors. Ma et al, in "Methods of making carbide and oxycarbide containing catalysts," U.S. Pat. No. 7,576,027 B2, disclose catalyst supports for fluid phase chemical reactions made from randomly entangled CNT aggregates. And Liu et al, in "Electrochemical capacitor with carbon nanotubes," U.S. Patent Application Publication US 2009/0116171 A1, disclose electrolytic capacitors having electrodes made from free-standing CNT films.

Smalley et al in "Method for producing self-assembled objects comprising single-wall carbon nanotubes and compositions thereof," U.S. Pat. No. 7,048,999 B2, disclose CNT assemblies formed by a complex process of CNT end-cap removal and derivatization. The buckypaper disclosed therein is a loosely assembled CNT felt or mat that is supported on a substrate. Other structures disclosed therein such as molecular arrays and self-assembled monolayers are described as requiring a substrate or matrix material such as a resin, metal, ceramic, or cermet. Furthermore, the self-assembled structures disclosed therein comprise functional agents to bond the CNTs together, which may adversely affect the structures' electrical properties.

Tohji et al in "Carbon nanotubes aggregate, method for forming same, and biocompatible material," U.S. Patent Application Publication US 2007/0209093 A1, disclose a method for CNT aggregate formation involving exposure to fluorine gas followed by sintering at high temperature and pressure. The aggregates are characterized as being fragile.

Liu et al in US 2009/0116171 A1, and Hata et al in "Aligned carbon nanotube bulk aggregates, process for production of the same and uses thereof," U.S. Patent Application Publication US 2009/0272935 A1, disclose methods for preparing CNT assemblies that require the use of CNT forests grown by CVD processes on a substrate. These methods involve a sequence of solvent washing, pressing, and/or drying steps and are limited to the scale of the starting CNT forest. Furthermore, these assemblies are characterized by a predominant orientation or alignment of the CNTs, which imparts the assembly with anisotropic and largely unidirectional properties.

Whitby et al in "Geometric control and tuneable pore size distribution of buckypaper and bucky discs," *Carbon* 46 (2008) pp. 949-956, disclose a frit compression method for forming CNT assemblies, which also requires high pressures. Also, the CNTs are not uniformly distributed within the assemblies, and the assemblies have large macropores and very high porosity (>80%).

A method to form a solution of single-walled CNTs in sulfuric super-acids is disclosed by Davis et al in "Phase Behavior and Rheology of SWNTs in Superacids," *Macromolecules* 37 (2004) pp. 154-160. A method is also disclosed to produce an entangled mat of CNT ropes by quenching in ether and filtering.

R. Signorelli et al in "High Energy and Power Density Nanotube Ultracapacitor Design, Modeling, Testing and Predicted Performance," presented at *The 19th International Seminar on Double Layer Capacitors and Hybrid Energy Storage Devices* (Dec. 7-9, 2009, Deerfield Beach, Fla., USA), and in "Electrochemical Double-Layer Capacitors Using Carbon Nanotube Electrode Structures," *Proceedings of the IEEE* 97, 11(2009), pp. 1837-1847, disclose vertically aligned single-walled CNT (SWCNT) and multi-walled CNT (MWCNT) "forest"-type assemblies intended for use as binder-free electrodes. These assemblies, however, show low bulk density of 0.45 g/cm$^3$ or less (0.1 g/cm$^3$ in the case of SWCNT), requiring an impractically high volume of material for adequate capacitor performance. Scalability of these CNT forests for manufacturing purposes is questionable, and they have inferior mechanical properties for use as current collectors.

A similar forest-type assembly produced from double-walled CNT (DWCNT), intended for use as a capacitor electrode, is disclosed by T. Asari in "Electric Double-Layer Capacitor Using Carbon Nanotubes Grown Directly on Aluminum", presented at *ICAC*2010, The 2010 *International Conference on Advanced Capacitors* (May 31-Jun. 2, 2010, Kyoto, Japan). This assembly has similar drawbacks as that of Signorelli; namely, low density, non-scalability, and inferior mechanical properties.

A. Izadi-Najafabadi et al, in "Extracting the Full Potential of Single-Walled Carbon Nanotubes as Durable Supercapacitor Electrodes Operable at 4 V with High Power and Energy Density," in *Advanced Materials*, n/a. doi: 10.1002/adma.200904349 (Published on-line June 18, 2010), describe a capacitor electrode based on a high-purity SWCNT forest processed into a binder-free assembly. This assembly shows attractive electronic performance characteristics as an electrode when tested under laboratory conditions. However, a sealed capacitor device could not be produced using this assembly due to excessive swelling when impregnated with the liquid electrolyte, indicating that the assembly had inferior mechanical strength and integrity.

There is interest in applying CNT technology to electrochemical double-layer capacitors (EDLC), sometimes referred to as "supercapacitors" or "ultracapacitors". This capacitor type has power density somewhat lower than, but nearly approaching, that of standard capacitors, but much higher energy density, approaching that of standard batteries. EDLCs have many applications in consumer electronics, and are attractive for use in hybrid gas-electric vehicles and all-electric vehicles. Activated carbon is the most common material currently used as electrodes in EDLCs. However, its performance may be reaching its technological limit and materials capable of higher energy and power densities are desired, especially for vehicle applications.

Lithium-ion is one battery type of particular interest for application of carbon nanotubes. Modern Li-ion batteries typically comprise a carbon-based anode, a cathode comprising an oxide such as $LiCoO_2$, $LiFePO_4$, $LiNiCoAlO_2$, or the like, and an electrolyte comprising a lithium salt in an organic solvent. Li-ion batteries are commonly used in consumer electronics, and are attractive for use in hybrid gas-electric and all-electric vehicles. However, improvements in battery performance are needed for widespread vehicle application. Specifically, increased energy density, power density, lighter weight, and better reliability are desirable. Particularly attractive are thinner and/or lighter electrode materials having lower electrical resistance, more efficient ion transfer capability, and sufficient mechanical strength for battery use.

In a standard fuel cell, hydrogen is combined with oxygen to generate electric current and water as a by-product. One fuel cell type of current high interest is the proton exchange membrane or polymer electrolyte membrane (PEM) fuel cell. This design comprises a membrane electrode assembly (MEA), which in turn comprises a center proton exchange membrane (PEM), and an electrode on either side of the PEM. Each electrode comprises a catalyst layer and a gas diffusion layer (GDL). The catalyst layer is typically comprised of fine metal particles or powder (platinum for the anode, often nickel for the cathode) on a porous support material such as pressed carbon black. The GDL layer, which contacts the metallic current collector on the face opposite the catalyst layer, is usually comprised of carbon paper or carbon cloth. As in the case of Li-ion batteries, improvements in PEM fuel cell performance are also needed for widespread application, especially in vehicles. Stronger and more lightweight materials, having good electrical conductivity and providing more efficient electrochemical reactions, are desirable for use as electrode materials, as either the catalyst support and/or the GDL.

In various energy storage devices, including capacitors, fuel cells, and batteries, a current collector comprising a metal plate is typically attached to the exposed (outward-facing) surface of the electrode, to collect the current generated by the device and conduct it towards the machine or equipment that the device is powering. Aluminum and copper are typical metals used as current collectors. It is desirable that the weight and complexity of the energy storage devices be reduced, and one such approach is to combine the function of the electrode with that of the current collector in a single material. This may only be accomplished if both the conductivity and mechanical strength and integrity of the material are near enough to those of traditional current collectors, such that the performance of the device is not diminished. In fact, enhancement of the device performance by using a combined electrode/current collector would be ideal.

WO 2010/102250 discloses preparing cohesive carbon assembly by dispersing carbon in a liquid halogen (e.g. bromine), followed by substantial removal of the liquid. However, bromine is highly toxic and expensive. Bromine is also highly corrosive to most metals, significantly reducing its utility as a dispersing medium, since no common metal container or metal surface may come in contact with a dispersion of carbon in a halogen-based liquid.

Therefore, there exists a need for a method for preparing a cohesive carbon assembly that can avoid using the corrosive and toxic halogen solvents.

SUMMARY OF THE INVENTION

The present invention is directed to a method of preparing a cohesive carbon assembly comprising: (a) obtaining a carbon starting material in a form of powder, particles, flakes, or loose agglomerates; (b) dispersing the carbon starting material in a selected organic solvent in a prescribed ratio to form a dispersion; and (c) substantially removing the organic solvent in a controlled manner; whereby the cohesive carbon assembly is formed.

The present invention is also directed to a cohesive carbon assembly prepared by the method described above, wherein the assembly is adherent to a metallic substrate.

The present invention is further directed to applications of the cohesive carbon assembly in, e.g. .electrical power storage and electromagnetic interference shielding. The cohesive carbon assembly may also be used as an electrode and/or a current collector in a capacitor, fuel cell, or battery.

DETAILED DESCRIPTION OF THE INVENTION

Figure 1:
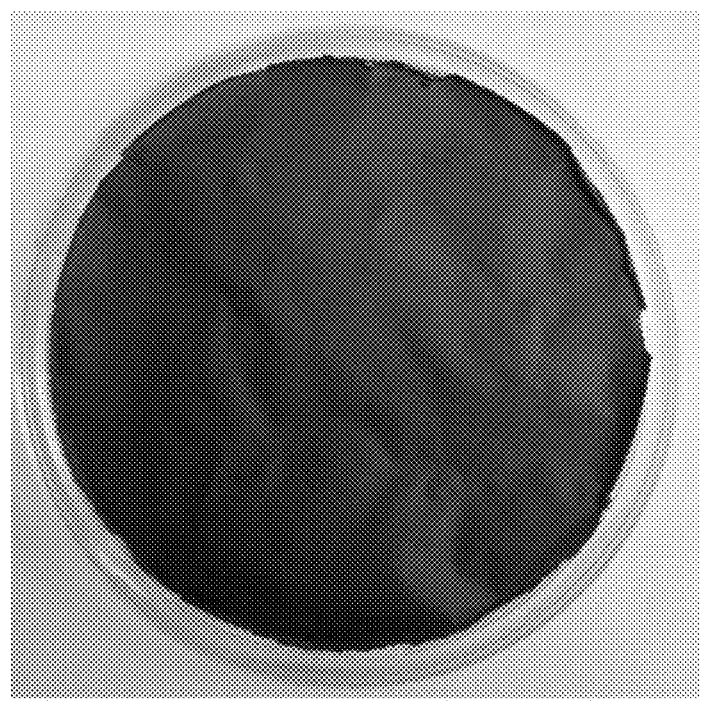
FIG. 1 is an optical image of a self-delaminating and self-standing cohesive assembly comprising single-walled carbon nanotubes (SWCNTs) prepared according to Example 2.
Figure 1:
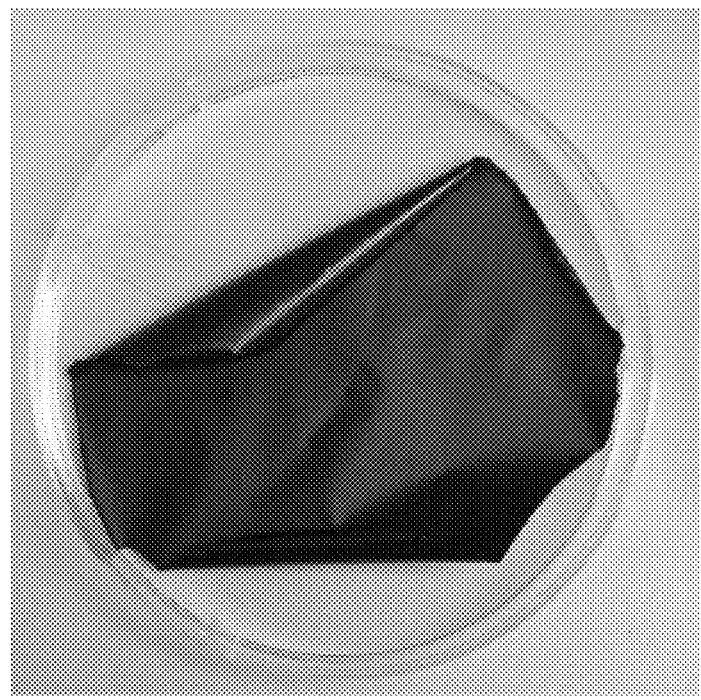

One aspect of the invention relates to a method of preparing a cohesive carbon assembly. The method comprises: (a) obtaining a carbon starting material in a form of powder, particles, flakes, or loose agglomerates; (b) dispersing the carbon starting material in an organic solvent in a prescribed ratio to form dispersion; and (c) substantially removing the organic solvent in a controlled manner; whereby the cohesive carbon assembly is formed.

A cohesive assembly is defined herein as a self-assembled monolithic structure in which the carbon is uniformly distributed; the cohesive assembly has a distinct shape and size that is free-standing. The cohesive assembly is further defined in that it does not adhere to any other material or surface, has sufficient mechanical strength and integrity that it does not require mechanical support by any other material, nor does it require the presence of a binder material to retain its strength and integrity. It also can be moved from place to place while retaining its structure, shape, and size. The cohesive assembly shows no particular orientation or alignment of the individual units of carbon of which it is comprised, and shows no unidirectional or oriented mechanical or electrical behavior.

The cohesive assembly is self-assembled in that, once the carbon in its initial form as described above is completely dispersed in a liquid medium, no additional chemical modifications, physical alterations, or mechanical forces are applied to the carbon in order to form the cohesive assembly.

The carbon starting material comprises a carbon material selected from the group consisting of carbon nanotubes (CNTs, e.g. SWCNTs, double-walled carbon nanotubes (DWCNTs), and multi-walled carbon nanotubes (MWCNTs)), graphene, graphite, expanded graphite, exfoliated graphite, amorphous carbon, and any combinations thereof. In one embodiment, the carbon starting material comprises SWCNTs.

In one embodiment, the carbon starting material is obtained in a form of powder, particles, flakes, loose agglomerates, or any appropriate forms that can be dispersed in the organic solvent. In another embodiment, the carbon starting material may be ground, pulverized, or mechanically altered in one or more standard techniques to obtain the carbon starting material in an appropriate form before being dispersed in the organic solvent. For example, CNTs may be purchased from a commercial source, such as SWCNTs available from Thomas Swan and Co., Ltd (Consett, County Durham, United Kingdom) under the product name "Elicarb SW." This material is supplied in the form of wetcake (loose agglomerates in an aqueous mixture) or as dry particles. The dry particles, which are typically smaller than 5 mm in the largest dimension, may be used as-received in the preparation of the cohesive carbon assemblies. Optionally, this material may be ground into smaller particles or powder and then used in the preparation of the cohesive carbon assemblies. The wetcake material may be dried by any standard method, then mechanically broken apart into particles or loose agglomerates, and then used in the preparation of the cohesive carbon assemblies. Optionally the dried wetcake material may be further ground into smaller particles or powder, and then used in the preparation of the cohesive carbon assemblies. Generally speaking, the powder, particles, flakes, or loose agglomerates of carbon used in the invented method are smaller than 1 cm in the largest dimension, preferably smaller than 3 mm in the largest dimension, and more preferably smaller than 1 mm in the largest dimension.

The organic solvent used in the method may be a substantially pure organic compound or a mixture of more than one organic compound. Suitable organic solvents include, but are not limited to, toluene, o-dichlorobenzene (ODCB), isopropyl alcohol (IPA), N,N-dimethylformamide (DMF), substituted or unsubstituted benzene, chlorobenzene, m-dichlorobenzene, 1,2,4-trichlorobenzene, bromobenzene, m-dibromobenzene, o-dibromobenzene, toluene, o-xylene, m-xylene, p-xylene, 1,2-dichloroethane, 1,2-dibromoethane, chloroform, primary amines, secondary amines, tertiary amines, dimethyl sulfoxide, and any combinations thereof.

Preferably, the organic solvent is selected from the group consisting of toluene, ODCB, IPA, DMF, and any combinations thereof. More preferably, the organic solvent is toluene, ODCB, or a combination thereof.

In step (b), the carbon starting material is dispersed in the organic solvent, in a prescribed ratio. A prescribed ratio of a carbon starting material to an organic solvent is defined as a ratio that will result in dispersion of the carbon in the organic solvent, and in the formation of the cohesive assembly when the organic solvent is removed. For a particular type of carbon starting material, there is a range of prescribed ratios that are determined experimentally. Within that range of prescribed ratios, that type of carbon starting material will disperse in the organic solvent and can form a cohesive assembly when the organic solvent is removed in a controlled manner.

If the ratios of the carbon starting material and organic solvent amounts are outside the range of the prescribed ratios for that particular type of carbon starting material, a cohesive carbon assembly will not form. For example, if the ratio of the carbon starting material to organic solvent is too high, the carbon starting material may not disperse completely in the organic solvent, but rather remain as powder, particles, flakes, or loose agglomerates, which may appear floating or suspended in the organic solvent, or settle to the bottom of the organic solvent in the container. If the ratio of carbon starting material to organic solvent is too low, the carbon starting material may disperse completely. It may then form into an assembly during removal of the organic solvent, but then break into pieces at the end of the process. Or, the dispersed carbon may assemble into particles or flakes, but not into a monolithic cohesive assembly. Or, the dispersed carbon may simply remain as a residue of powder, particles, flakes, or loose agglomerates in the container when the organic solvent is removed.

In one embodiment, the prescribed ratio of the carbon starting material to the organic solvent may be between about 0.015 and about 200 mg per gram of organic solvent, between about 0.01 and about 50 mg per gram of organic solvent, between about 0.05 and about 50 mg per gram of organic solvent, between about 0.1 and about 20 mg per gram of organic solvent, or between about 0.1 and about 10 mg per gram of organic solvent. "About", as used herein, refers to +/−10% of the recited value.

In one embodiment, the carbon starting material comprising SWCNT is dispersed in the organic solvent comprising o-dichlorobenzene in a prescribed ratio of between about 0.1 and about 20 mg carbon starting material per gram of o-dichlorobenzene.

In another embodiment, the carbon starting material comprising SWCNT is dispersed in the organic solvent comprising toluene, in a prescribed ratio of between about 0.1 and about 20 mg carbon starting material per gram of toluene.

Dispersing, as used herein, is forming a stable suspension of carbon in the organic solvent. A stable suspension is one in which no visible powder, particles, flakes, or loose agglomerates precipitate out of the organic solvent or settle to the bottom of the mixture when no mechanical agitation is applied. In one embodiment, to disperse the carbon in the organic solvent, the carbon is first combined with the organic solvent in a container to form a mixture, and then the mixture is mechanically agitated by one or more standard methods, for example, without limitation, mechanical stirring, and/or sonication, and/or microfluidization.

Dispersion of the carbon starting material in the organic solvent in step (b) may be carried out at a suitable temperature under a suitable pressure wherein the organic solvent is in a liquid form, i.e. the melting point and the boiling point of the organic solvent under the suitable pressure. In one embodiment, the carbon starting material is dispersed in the organic solvent at a temperature between 0° C. and 100° C., between ambient room temperature and about 45° C. or between 10° C. and 30° C. Ambient room temperature (about 20° C.) and pressure are typically suitable conditions.

Dispersion of the carbon starting material in the organic solvent may be carried out in the presence of one or more types of mechanical agitation. The dispersion step may comprise more than one periods of mechanical agitation. In each period, one or more types of mechanical agitation may be carried out. The same type of mechanical agitation carried out at different periods may have the same or different parameters. In one embodiment, the dispersion step comprises three periods of mechanical agitation. For example, the first period of mechanical agitation comprises mechanical mixing at 10,000 rpm for 30 minutes in the presence of sonication, the second period of mechanical agitation comprises mechanical mixing at 5,000 rpm for 10 minutes in the presence of sonication, and the third period of mechanical agitation comprises sonication for 2 hours at 45° C.

Mechanical agitation may be carried out at a suitable mixing speed (e.g. about 500 rpm to about 50,000 rpm) with a high shear mixer comprising a rotor or impeller, together with a stationary component known as a stator, or an array of rotors and stators. The mixer is used in a tank containing the carbon starting material and the organic solvent mixture to be mixed or in a pipe through which the mixture passes, to create shear. In one embodiment, a two-stage mixing process starting at a first speed (e.g. about 10,000 rpm) for a first time period (e.g. about 30 minutes) followed by a second speed (e.g. about 5,000 rpm) for a second time period (e.g. about 10 minutes) is adopted.

Sonication may be carried out by a variety of methods using commercially available equipment, examples include, without limitation, an ultrasonic processor with a probe or wand, and an ultrasonic bath or tank. Sonication may be carried out for a suitable time period at a suitable energy level at a suitable temperature. In one embodiment, the suitable time period is between about 0.1 and about 100 hours, between about 0.1 and about 10 hours, or about 130 minutes. The suitable energy level is at least 0.01 watt/gram of solvent, or between 0.16 watt/gram of solvent and about 1.6 watt/gram of solvent. The suitable temperature is the same as described supra.

In one embodiment, the carbon starting material comprising SWCNT is dispersed in the organic solvent by mechanical stirring and/or sonication.

The dispersion of carbon starting material in the organic solvent in step (b) is different from commonly known methods of carbon dispersion, and in particular, CNT dispersion, in that no surfactant chemicals are needed to disperse the carbon starting material. In one embodiment, the carbon starting material is dispersed in the organic solvent substantially free of surfactants. Surfactants are typically used to disperse carbon, and more specifically, carbon nanotubes, in a liquid, and in known methods of preparing carbon assemblies, surfactants are usually present as a residue. Examples of such surfactants include but are not limited to cetyl trimethylammonium bromide (CTAB), dodecylbenzenesulfonic acid sodium salt (NaDDBS), sodium cholate, sodium dodecyl sulphate (SDS), polyoxyethylene (10) octylphenol (Triton X-100) and poly(ethylene oxide) (20) sorbitan mono-oleate (Tween 80). "Substantially free of surfactants," as used herein, means less than 10%, preferably less than 1%, and more preferably less than 0.1% (w/w) of surfactants is present relative to the weight of carbon starting material used to prepare the assembly. Such surfactants are not needed to disperse the carbon in the organic solvent, when the carbon is dispersed in an organic solvent according to the method of the invention.

Typically, ionic surfactants such as cetyl trimethylammonium bromide (CTAB), dodecylbenzenesulfonic acid sodium salt (NaDDBS), sodium cholate, and sodium dodecyl sulphate (SDS), or nonionic surfactants such as polyoxyethylene (10) octylphenol (Triton X-100, Dow Chemical Co.) and poly(ethylene oxide) (20) sorbitan mono-oleate (Tween 80, ICI Americas, Inc.) are needed to effectively disperse CNTs in a liquid medium such as an aqueous-based solution or an organic solvent. These surfactants, when used to disperse CNTs, may remain as a residue and thereby degrade the electrical or mechanical properties of the final CNT-derived product. The cohesive assembly, when prepared by the present method, need not contain surfactants. Therefore, the method of the current invention represents a substantial improvement over existing techniques for dispersing CNTs in an organic solvent.

Furthermore, the carbon starting material is dispersed in the organic solvent that is substantially free of a binding material (e.g. polymer, inorganic, or hybrid material). For industrial use, such binding materials are typically required in order to form a carbon monolith. For example, to form a monolith of activated carbon for use in an electrochemical double layer capacitor (EDLC), a polymer binding material such as PTFE (polytetrafluoroethylene) is needed to hold the carbon particles together. Similarly, to form carbon aerogel monoliths typically requires impregnation with an organic-based aerogel that acts as a binder and is then later removed by pyrolysis. In the method of the current invention, no such material is needed in order to form the cohesive carbon assembly as a monolith. "Substantially free of a binding material," as used herein, means less than 10%, preferably less than 1%, and more preferably less than 0.1% (w/w) of binding material is present relative to the weight of carbon starting material used to prepare the assembly.

In certain embodiments, the carbon-organic solvent dispersion may be applied to a surface after step (b). The surface may be that inside a container such as a dish, beaker, cylinder, tank, etc. In one embodiment, the surface is a hydrophobic surface. Such hydrophobic surface may be prepared in advance of applying the dispersion to the surface, by applying any of various hydrophobic treatments or coatings to the surface of a container or substrate material. For example, hydrophobic treatment solution described in U.S. Pat. No. 6,395,331B1 to Yan et al, or other dimethyl containing, or fluorinated dimethyl containing treatment solutions may be used to prepare a hydrophobic surface. As another example, a container or substrate may be coated with a hydrophobic material such as Teflon®. The substrate or container material onto which the hydrophobic treatment or coating may be applied can be a polymer, glass, metal, or ceramic.

In another embodiment, the surface comprises a hydrophilic surface (e.g. metal (e.g. aluminum, nickel, copper, gold, silver, platinum, and other metals typically used as electrodes or current collectors), glass, silicon, plastic, and ceramic.)

To achieve a free-standing (self-delaminating) cohesive carbon assembly, the method further comprises applying the carbon-organic solvent dispersion to a hydrophobic surface having water contact angle of at least about 80°. To achieve an adherent cohesive carbon assembly as a film, the method further comprises applying the carbon-organic solvent dispersion to a hydrophilic surface having water contact angle of less than about 80°.

The dispersion may be applied to the surface by any known method, e.g. without limitation, spin-coating, dip-coating, flow-coating, spray coating, casting, or a combination thereof. The spin-coating may be carried out at a spinning speed of about 10 rpm to about 10,000 rpm, or about 300 rpm to about 5,000 rpm for a time of at least about 5 seconds. The dip-coating may be carried out at a withdrawing speed of about 0.01 to about 1.0 cm/s, about 0.1 to about 0.4 cm/s, or 0.2 cm/s.

In step (c), the organic solvent of the dispersion is substantially removed, i.e. greater than 99% of the organic solvent is removed, in a controlled manner, whereby the cohesive assembly of carbon is formed. In order for the cohesive assembly to form, the organic solvent must be removed in a controlled manner. "Removing in a controlled manner," as used herein, refers to removing the organic solvent in a rate and method such that the dispersed carbon self-assembles into the cohesive assembly of carbon, and the assembly remains intact as a single cohesive monolith throughout the removal process, and after the organic solvent removal is completed. Any method to remove the organic solvent in a controlled manner that allows the self-assembly of the carbon into a cohesive assembly, and allows the assembly to remain as a cohesive assembly (monolith) after the organic solvent removal is completed, is within the scope of the invention. Examples of a controlled manner of removing organic solvent may include slow evaporation, slow draining of the organic solvent from the container, or a combination thereof. It is important not to remove the organic solvent so rapidly that will disturb or prevent the carbon from forming a cohesive assembly (monolith). It is also important not to agitate the mixture during the removal process.

An example of a non-controlled manner of removing the organic solvent is pouring off the organic solvent by tipping the container (decanting), as this would clearly disturb the formation of the cohesive assembly and not result in a monolithic form. Another example of a non-controlled manner is boiling of the organic solvent, as the accompanying vapor bubble generation and resultant agitation of the mixture would clearly disturb the cohesive assembly and prevent the monolith from forming. A third example of a non-controlled manner would be direct physical removal of the liquid at or through its exposed top surface in the container, for example, by suctioning or siphoning through a tube or pipe. The breaking of the surface of the liquid by the tube or pipe would clearly interfere with the self-assembly of the carbon into a monolith.

In one embodiment, the controlled removal of organic solvent is conducted by slow evaporation. During the initial stages of this evaporation, the dispersed carbon first nucleates on the top surface of the organic solvent, and then begins to assemble or coalesce into "islands" of carbon on the surface of the liquid. As evaporation progresses, the islands grow and join together to form larger islands, eventually joining into a single monolithic disc, wafer, or film, i.e., a cohesive assembly of carbon.

If the organic solvent is evaporated too quickly, a cohesive assembly of carbon will might not form. In such instances, the carbon may not nucleate on the top surface of the liquid, but may instead remain as a powder or particle residue in the container. Or, the carbon may nucleate on the surface, and islands may begin to form, but they will not coalesce into a monolithic cohesive assembly, and remain as randomly-shaped agglomerates of carbon rather than a cohesive assembly. Or, the islands may coalesce into a monolith, but then later break apart into smaller pieces.

The specific conditions for controlled removal of organic solvent that will result in the formation of a cohesive assembly of carbon depend on the type of the carbon starting material and the organic solvent, and can be determined experimentally. For example, the organic solvent is removed by evaporation at a suitable pressure, a suitable temperature for a suitable time. The suitable pressure may be between about 5,000 Torr and about 0.001 Torr, between about 1,500 Torr and about 0.01 Torr, between about 800 Torr and about 0.01 Torr, between atmospheric pressure (about 760 Torr) and 0.01 Torr, between about 100 Torr and about 0.01 Torr, between about 10 Torr and about 0.1 Torr, or between about 1 Torr and about 0.1 Torr. The suitable temperature may be between −20° C. and about 200° C., between room temperature (about 20° C.) and about 180° C., or between about 40° C. and about 80° C. The suitable time may be between about 5 seconds and about 100 hours, between about 10 seconds and about 100 hours, between about 10 minutes and about 40 hours, or between about 1 hour and about 20 hours.

In one embodiment, the organic solvent is removed in a closed system at a pressure below atmospheric pressure. In another embodiment, the organic solvent is removed by evaporation at atmospheric pressure. Either condition may be accompanied by heating to accelerate the evaporation of the organic solvent, provided that the rate of evaporation is controlled such that formation of the cohesive assembly of carbon is not disturbed or prevented.

The controlled removal of the organic solvent may also occur at a temperature and pressure without forming bubbles in the solvent, and without boiling of the solvent.

The evaporation of organic solvent may alternatively be controlled to form a cohesive assembly, by monitoring the evaporation rate of the organic solvent and maintaining it within a range that will not prevent or disturb the formation of the assembly. The lower end of the operable range of evaporation rates is not particularly limited, except that a very low rate will result in an impractically long time to produce the cohesive assembly. The evaporation of organic solvent typically follows the classic and well-known theory of two-stage drying of porous bodies first proposed by Thomas .K. Sherwood in "The Drying of Solids—I", *Industrial Engineering and Chemistry* 21, 1 (1929), 12-16, and in "The Drying of Solids—II", *Industrial Engineering and Chemistry* 21, 10 (1929), 976-980. During the first drying stage, also known as the Constant Rate Period, the evaporation rate is preferably between about 0.01 and about 10 milliliters/minute (ml/min), more preferably between about 0.10 and about 1.0 ml/min. During the second drying stage, also known as the Falling Rate Period, the evaporation rate is preferably between about $5\times10^{-5}$ ml/min and about $5\times10^{-2}$ ml/min, more preferably between about $5\times10^{-4}$ and about $7\times10^{-3}$ ml/min.

Typically, greater than 99% of the organic solvent is removed by evaporation. Any remaining organic solvent may optionally be removed after evaporation, by rinsing the cohesive assembly with an organic solvent such as ethanol or isopropanol and then drying either at room temperature or with mild heating in an oven.

The formed cohesive carbon assembly may be removed from the container manually or by lightly rinsing the inner surfaces of the vessel with a fluid such as a dilute acid or organic solvent. The product assembly may then receive a final drying at atmospheric pressure or under vacuum, which may be accompanied by mild heating.

In certain embodiments, a cohesive carbon assembly formed by the method has no residue of the organic solvent detectable by Fourier Transform Infrared Spectroscopy (FT-IR), Energy Dispersive X-Ray Spectroscopy (EDS), or Thermogravimetric Analysis (TGA).

In certain embodiments, the removed organic solvent may be collected. For example, a LN2 trap can be used to collect the removed organic solvent. The recovered organic solvent may be reused in the method directly or after purification if necessary.

Characterization of Cohesive Carbon Assemblies

A cohesive carbon assemblies prepared by the method of the invention are characterized by the substantial absence of surfactants during the preparation and in the final product.

Cohesive carbon assemblies comprising CNTs, prepared by the method of the invention, feature high effective carbon packing density compared to other known CNT assemblies. The cohesive carbon assemblies typically have effective CNT packing density of at least about 0.5 g/cm$^3$, often have densities higher than 1.0 g/cm$^3$, and have shown densities as high as 1.5 g/cm$^3$. For example, the cohesive carbon assemblies have effective CNT packing density of between about 0.3-1.9 g/cm$^3$, preferably between about 0.5-1.5 g/cm$^3$, and more preferably between about 0.8-1.5 g/cm$^3$ or between 1.0-1.5 g/cm$^3$. This high density imparts these assemblies with good mechanical strength and integrity. This high density also contributes to their superior electrical properties; in particular their low resistivity compared to other known CNT assemblies.

To determine the effective CNT packing density in a CNT-derived carbon assembly, first the apparent density of the assemblies is determined by carefully measuring the weight of the assembly using a standard analytical balance, then measuring the dimensions of the assembly using a digital micrometer or optical or scanning electron microscope, then calculating the volume of the sample from the dimensions, and dividing the weight by the volume. This calculation provides the apparent density of the assembly. Alternatively, the apparent density may be determined using a density balance and Archimedes' principle. Then, using one of various methods such as energy dispersive x-ray spectroscopy (EDS), neutron activation analysis (NAA), or thermogravimetric analysis (TGA), the weight fraction of carbon (i.e., CNTs) in the assembly can be determined. Finally, the effective packing density of CNTs is calculated by multiplying the apparent density by the weight fraction of carbon in the assembly.

The assemblies can be produced in a desired size or shape, which is determined by the amount of carbon used to prepare the assembly, and by the size and shape of the container in which the carbon assembly is prepared. This may allow the assemblies to be used in various applications requiring carbon assemblies of various shapes and sizes. When the organic solvent is removed from the dispersion, the carbon assembly typically self-assembles in the shape and size of the bottom of the vessel in the horizontal plane, with a vertical, i.e., perpendicular thickness that is determined by the amount of carbon used and the size of the container. Greater amounts of carbon will produce a thicker, wafer- or disc-like cohesive assembly, while less carbon will produce a thinner, film-like assembly. Decreasing or increasing the diameter or cross-sectional area of the container used to prepare the assembly has similar effects on assembly thickness. In certain embodiments, the assembly has a thickness of about 0.02 µm to about 2,000 µm, or about 0.1 µm to about 500 µm. In one embodiment, the assembly is a self-delaminating assembly having a thickness of about 0.1 µm to about 2000 µm, about 1 µm to about 500 µm, or about 10 µm to about 50 µm. In another embodiment, the assembly is an adherent assembly having a thickness of about 0.02 µm to about 2000 µm, about 0.02 µm to about 500 µm, or about 0.02 µm to about 50 µm.

The cohesive carbon assemblies prepared by the method of the invention also feature low electrical resistivity compared to other carbon assemblies. These assemblies typically have resistivity of less than about 0.1 Ωcm, about 0.02-0.05 Ω-cm, and an electrical sheet resistance of less than about 2,000 Ω per square, or between about 8 and about 17 Ω per square. This low electrical resistivity along with mechanical strength and integrity may allow various applications of these assemblies, for example, as electrodes for batteries or supercapacitors, or as electromagnetic interference (EMI) shielding materials. This low resistivity is related to the high effective carbon packing density of the assemblies in that as this density increases, empty space between individual carbon entities such as nanotubes, tube bundles, or graphite platelets decreases, and the area of contact between these carbon entities increases. This naturally leads to more efficient and higher current flow through the assembly, thereby decreasing its resistivity.

Resistivity of the cohesive assembly is determined as follows: From each assembly, a sample of rectangular or square geometry is cut that possesses lengths greater than 1 cm on all sides. The sample is mounted in a sample mount, and two electrical contact pairs (two current carrying and two voltage sensing) are directly compressed to the sample, in a standard Kelvin-type (4-point) probe configuration. The sample is positioned such that the four metal tips of the four-point probe make direct contact with the sample without puncturing through it.

A constant current is made to flow the length of the sample by using a high impedance current source. The current source is typically set to apply a current of $0.1 \times 10^{-3}$ A, $1 \times 10^{-3}$ A, $10 \times 10^{-3}$ A, or $100 \times 10^{-3}$ A. The voltage drop across the sample is measured using a high impedance digital voltmeter. The surface (sheet) resistance, $R_s$ in $\Omega$ (or $\Omega$/sq), of the sample is the ratio of the stable voltage registering on the voltmeter, V, to the value of the output current of the current source, I, multiplied by the geometric factor $\pi/\ln 2 \approx 4.53$:

$$R_s = 4.53 \ (V/I).$$

By measuring the thickness (t) of the sample, using a profilometer, digital micrometer, or scanning electron microscope, the electrical resistivity ρ of the sample in $\Omega$-cm, can be calculated using the formula:

$$\rho = R_s(t)$$

Additionally, cohesive carbon assemblies prepared by the method of the invention using carbon starting material comprising CNTs (e.g. SWCNTs) display no more defects than the carbon starting material. A known technique useful for evaluating the quality of CNTs, i.e., the concentration of structural defects and amorphous carbon impurities included therein, is by measuring the intensity ratio of two characteristic Raman infrared spectral peaks, called the G/D ratio. The G-line is a characteristic feature of the graphitic layers and corresponds to the tangential vibration of the carbon atoms. The D-line is a typical sign for defective graphitic structures. When determining the quality level of a CNT sample via Raman spectroscopy, the absolute intensities of the G and D band peaks are not particularly relevant. Rather, the ratio of the intensity of the two peaks is the relevant measure. The comparison of the ratios of these two peaks' intensities gives a measure of the quality of the CNT samples. Generally, the G/D ratio is the ratio of good to bad CNT peaks. Thus, CNTs having a higher G/D indicate a lower amount of defects and a higher level of quality.

A G/D ratio is typically determined using a Raman spectroscopy technique. Any of various commercially available instruments may be used to measure the G and D band intensities and to calculate the G/D ratio. One example of such an equipment is available from HORIBA Jobin Yvon Inc., Edison, N.J., under the model name LabRAM ARAMIS.

In a CNT sample, the G/D ratio may change after treatment. The present method has the advantage that the G/D ratio of the formed cohesive carbon assembly is about the same or greater than the G/D ratio of the carbon starting material, indicating that the method does not introduce structural defects during the process.

The method of the current invention provides additional distinct advantages over existing methods for fabricating a carbon assembly, and in particular, for fabricating such an assembly as an adherent wafer or film onto a metallic substrate or backing sheet made of, for example, aluminum, copper, iron, nickel, platinum, gold, silver, titanium, alloys thereof, and so on.

Firstly, the current method, compared to other known methods utilizing halogens as the dispersing solvent, enables the use of metallic containers or surfaces onto which the dispersed carbon may be cast or deposited. It is well-known that halogens such as bromine are highly corrosive to many metals, including those commonly used in electronic components such as aluminum, copper, nickel, iron, and so on. Aluminum in particular is a commonly used material for current collectors in capacitors, batteries, and other energy storage devices. Bromine reacts violently on contact with aluminum, producing $AlBr_3$. Therefore, it is not suitable to utilize bromine as a dispersing solvent for carbon nanotubes or other forms of carbon to produce a cohesive assembly in a metal container, or deposit a cohesive carbon film on a metal substrate. The current method, employing a selected organic solvent that is non-corrosive to metals as a dispersing medium, enables the fabrication of a cohesive assembly of carbon in a metal vessel, or as a cohesive film on a metal substrate.

Second, the current method enables preparation of an adherent, cohesive carbon assembly on a metal substrate without the use of any bonding material to attach the carbon assembly to said substrate. Standard industrial methods for attaching carbon-based electrodes to metal backing sheets, for example, in the assembly of electrochemical double-layer capacitors (EDLCs), typically entails the use of a bonding material. These materials may have conductive additives to reduce their electrical resistance, but they are typically polymer-based and are inherently less conductive than both the carbon assembly and the metal backing sheet. Thereby, the process of attaching the carbon assembly to the metal with a bonding material results in increased contact resistance between the carbon and metal, and reduced performance of the device overall. The current method, in contrast, allows the fabrication of an adherent carbon assembly on a metal substrate, resulting in an article comprising a carbon assembly attached to a metal substrate, with no bonding material, having reduced contact resistance between the carbon and the metal. This results in improved performance of the device in which this article is used, such as an EDLC, fuel cell, battery, etc.

Applications of Cohesive Carbon Assemblies

Another aspect of the invention relates to an article comprising a substrate and a cohesive carbon assembly coated onto at least one surface of the substrate, wherein the cohesive carbon assembly has been prepared by the method described supra.

The cohesive carbon assembly may be otherwise treated after its fabrication, in order to enhance its performance for certain applications. For example, for application as a fuel cell electrode, a coating of metal particles, such as platinum, may be advantageous for its catalytic properties. For battery electrode applications, metal particle coatings such as iron, platinum, palladium, nickel, lithium, or other appropriate metals may be desired. Such particle coatings may be accomplished using a method disclosed by Grigorian et al in US Patent Application Publication US 2009/0015984A1, which is hereby incorporated by reference.

The cohesive carbon assembly of the present invention has particular advantages over other types of carbon assemblies for use as an electrode or current collector in electrochemical capacitors, fuel cells, or batteries. These advantages include its inherent mechanical strength and integrity, low electrical resistivity, ability to be fabricated and/or further modified to a desired shape and size, and high carbon packing density that results in excellent energy storage capabilities (i.e., power density and energy density).

The cohesive carbon assembly is appropriate for use as an electrode in a capacitor or a capacitor cell, which are used interchangeably in this application, due to its desirable combination of electrical and mechanical properties. The capacitor may be of any type that comprises two electrodes separated by an insulating material. The capacitor may be a simple electrostatic capacitor with a bulk dielectric material separating the two conducting electrodes, or an electrolytic capacitor, in which one or both of the electrodes comprises an electrolyte. The cohesive carbon assembly is especially suitable for use as an electrode in an electrochemical double-layer capacitor (EDLC), sometimes referred to as a "super-capacitor" or "ultracapacitor".

The cohesive carbon assembly, and in particular the assembly comprising carbon nanotubes, may be altered after fabrication by the invented method into an electrode of suitable size or shape for direct installation into a capacitor cell. The electrode may be disc-shaped, i.e. round or ovoid, or it may be a polygon having three or more sides. The size and shape are determined only by the size and shape of the capacitor device in which it will be used. The thickness of the electrode is not particularly limited, but certain thicknesses may be preferable for use in capacitor devices. If the electrode is too thick, resistance of the electrode may be too high or energy transfer will be inefficient. If it is too thin, it will not have the necessary mechanical integrity or energy storage potential for capacitor use. Generally, the thickness is preferably between about 0.02 µm and about 2,000 µm, or between about 0.1 µm and about 500 µm. In one embodiment, the assembly is a self-delaminating assembly having a thickness of about 0.1 µm to about 2000 µm, about 1 µm to about 500 µm, or about 10 µm to about 50 µm. In another embodiment, the assembly is an adherent assembly having a thickness of about 0.02 µm to about 2000 µm, about 0.02 µm to about 500 µm, or about 0.02 µm to about 50 µm.

The cohesive carbon assembly may be optionally purified of metallic impurities prior to use as a capacitor electrode. Specifically, for an assembly comprising carbon nanotubes, removal of metallic impurities that are residues of the CNT synthesis process may improve the electrical and energy storage properties of the assembly. This purification may be accomplished by various means, with treatment with a halogen gas, and chlorine gas in particular, being the preferable method. The parameters of this treatment process are not particularly limited, provided the carbon is not damaged or degraded during the process.

In one embodiment, the removal of metallic impurities from the cohesive carbon assembly is achieved by treatment with chlorine gas at elevated temperature in a controlled-atmosphere furnace such as a quartz-tube furnace. The chlorine gas is typically used in the form of a mixture with an inert carrier gas such as nitrogen, helium, or argon. The chlorine content in the mixture is typically between 1 and 20% (v/v), preferably between 2 and 10%, more preferably about 5%. The temperature in the furnace during the treatment is typically between 800° C. and 1200° C., preferably between 900° C. and 1100° C. The time needed for the treatment depends on various factors such as the amount of material to be treated, the type of gas used, furnace design and method of gas delivery, etc. Typically, however, the time of treatment is between about 15 and 180 minutes, preferably between 30 and 90 minutes. The flow rate of the gas mixture also depends on various factors including those mentioned, but in the example embodiment of a quartz-tube furnace, the linear flow rate of the gas is typically between 0.1 and 20 cm/min, preferably between 0.25 and 10 cm/min.

To evaluate the performance of a cohesive carbon assembly as a capacitor electrode, one electrode may comprise a cohesive carbon assembly in an asymmetrical capacitor cell, or two electrodes may each comprise a cohesive carbon assembly in a symmetric capacitor cell. The method of evaluating the performance of the cohesive carbon assembly as a capacitor electrode is not particularly limited, and there are various standard methods known in the field. Typically, the capacitor cell comprising the two electrodes separated by an insulating material is assembled with metal plates as current collectors attached to the outer surfaces of the electrodes. The cell is then submerged in an appropriate electrolyte and a voltage is applied. For EDLCs, the preferable applied voltage (absolute value) is between 0 and 2 volts, or between 0 and 4 volts, to evaluate performance for consumer electronics and vehicle applications. Analytical methods used to evaluate the electrode performance may include leakage current measurement, electrochemical impedance spectroscopy (also known as dielectric spectroscopy), charge/discharge cycling using commercially available test equipment, and the like.

To determine the performance advantage of the cohesive carbon assembly as a capacitor electrode, the properties measured are compared to those of capacitors comprising electrodes of other standard materials such as activated carbon, or other types of CNT-based electrodes such as CNT forest-derived materials. Cohesive assemblies of carbon prepared by the present method in general show superior power performance as capacitor electrodes, compared to activated carbon electrodes and other types of CNT-based electrodes. The superior performance includes lower leakage current and faster discharge time, and a better combination of power density and energy density, important parameters for electric vehicle and consumer electronics applications. Furthermore, the cohesive assemblies possess the necessary mechanical integrity to be packaged directly into sealed capacitor cells, whereas the other CNT-based electrodes do not.

Similarly as for a capacitor, the cohesive carbon assembly of the present invention is suitable for use as an electrode in a battery. The battery may be of any type comprising two electrodes separated by electrolyte. Of particular interest is the Li-ion battery type, in which the cohesive carbon assembly is suitable for use as the anode or cathode material, or both. As for the capacitor application, the size, shape, and thickness of the battery electrode comprising the cohesive carbon assembly are not particularly limited. Preferred thicknesses are also similar to those for capacitor electrodes.

The cohesive carbon assembly may be used as a battery electrode in its as-prepared form, i.e. as an assembly comprising nearly pure carbon. Or, the assembly may be further treated after it is fabricated by, for example, coating with metal particles using the method described in US Patent Application Publication US 2009/0015984A1. The metal coating may be selected such that the assembly is suitable for use as the anode, or it may be selected such that the assembly is suitable for use as the cathode. The appropriate metal coating depends on the overall design of the cell.

In its as-prepared form, a cohesive carbon assembly of carbon nanotubes, and more preferably, a cohesive assembly of SWCNT, is especially appropriate for use as the anode in a Li-ion battery cell, with a corresponding cathode comprising one or more Li-containing oxides such as $LiCoO_2$, $LiFePO_4$, or $LiNiCoAlO_2$. The electrode comprising the cohesive carbon assembly requires no binder material and can be installed in a battery cell in its as-prepared form.

A battery containing a cohesive carbon assembly electrode may be performance tested using a standard method such as is described by Y. NuLi et al in "Synthesis and characterization of Sb/CNT and Bi/CNT composites as anode materials for lithium-ion batteries," *Materials Letters* 62 (2008) 2092-2095, or by J. Yan et al in "Preparation and electrochemical properties of composites of carbon nanotubes loaded with Ag and TiO$_2$ nanoparticle for use as anode material in lithium-ion batteries," *Electrochimica Acta* 53 (2008) 6351-6355In this manner, the performance of a cohesive carbon assembly-based lithium-ion battery anode is thereby compared to the performance of lithium-ion battery anodes composed of other materials such as graphite, hard carbon (i.e. diamond-like carbon), titanate, silicon, germanium, other CNT-based electrodes that require binder or structural support, and the like.

The cohesive carbon assembly of the present invention is also suitable for use as an electrode in a fuel cell. In a PEM-type fuel cell, the electrode comprises a catalyst support layer and a gas diffusion layer (GDL). The cohesive carbon assembly, as described earlier, has low resistivity and high mechanical strength and integrity. Furthermore, it exhibits sufficiently high pore volume to allow the needed diffusion of gaseous species (hydrogen, oxygen, water vapor) for fuel cell use. The total pore volume of the assembly comprising SWCNT is typically greater than 1.0 cm$^3$/g, often greater than 1.5 cm$^3$/g, and has been observed to exceed 2.0 cm$^3$/g. Total pore volume correlates with total porosity, and approximately correlates with gas permeability. Therefore, the cohesive carbon assembly, and in particular the SWCNT assembly, is appropriate for use as either the catalyst support or the GDL, or as both simultaneously.

The size and thickness of the cohesive carbon assembly, for use in a fuel cell, are not particularly limited. However, the thickness should be selected such that the desired level of gas permeability is maintained, and, when used as the catalyst layer, such that the desired level of catalytic activity through the layer is achieved. The thickness of the cohesive carbon assembly of this invention when used as a catalyst layer in a fuel cell is typically 5-20 μm thick. The thickness of the cohesive carbon assembly of this invention when used as a GDL in a fuel cell is typically 100-300 μm thick.

For use as a catalyst support in a fuel cell, the cohesive carbon assembly is typically coated with metal particles that act as the catalysts for the electrochemical reaction. The type of metal particles is chosen based on whether the electrode is to be the cathode or anode in the fuel cell. For example, if the assembly is to be the anode, the metal may be platinum. If the assembly is to be the cathode, the metal may be nickel. The coating may be accomplished by any appropriate method, for example, by the method described in US Patent Application Publication US 2009/0015984A1. This coating method comprises two essential steps: (1) the assembly is treated with a halogenated precursor, such as platinum iodide (PtI$_2$), nickel iodide (NiI$_2$), palladium iodide (PdI$_2$), or the like, to form a halogenated intermediate; (2) residual halogen is removed and the metallic species deposited on the assembly are reduced to pure metal by heating combined with hydrogen gas treatment.

To evaluate the performance of the cohesive carbon assembly as a catalyst support, GDL, or both, a PEM-type fuel cell is assembled with the cohesive carbon assembly component in place of the standard material typically used for that component. For example, if the cohesive carbon assembly is the catalyst support, then it is coated with the catalyst metal particles and then installed in the fuel cell in place of the standard catalyst support, usually Pt-coated or Ni-coated carbon black. If the cohesive carbon assembly is the GDL, then it is installed in the fuel cell in place of the standard GDL, usually carbon paper or carbon cloth. If the cohesive carbon assembly is both the catalyst support and the GDL, it is installed in place of both standard components. The fuel cell with the cohesive carbon assembly installed may be performance tested by any standard method, such as that described by B. Fang et al in "Nanostructured PtVFe catalysts: Electrocatalytic performance in proton exchange membrane fuel cells," *Electrochemistry Communications* 11 (2009) 1139-1141. Performance parameters such as cell voltage and power density vs. current density are thus compared with those of standard fuel cells or fuel cells containing other potential alternative catalyst support/GDL materials.

Energy storage devices such as capacitors, batteries, and fuel cells, typically comprise a current collector and an electrode on one side of an insulating material or an electrolyte, and another current collector and another electrode on the other side of the insulating material or electrolyte. For example, in an electrostatic capacitor, the separating material is an insulating material, whereas in EDLCs, batteries, and fuel cells, the separating material is an electrolyte. The electrolyte in EDLC, battery, or fuel cell is divided by a thin membrane allowing ionic conduction between the electrodes. The cohesive carbon assembly of the present invention is appropriate for use as a current collector in these energy storage devices, due to its low resistivity, good mechanical properties, and ability to be fabricated into a desired shape and size.

The cohesive carbon assembly may further be used concurrently as a free-standing electrode and a current collector. A free-standing electrode, as used herein, refers to an electrode containing the cohesive carbon assembly as the only conductive material. The advantage of this is that the entire mass contributes to the usable electrode capacity. This is in contrast to a conventional electrode where the usable electrode capacity is decreased because of mass averaging of the active material composite layer and a metal current collector. Typically, the current collector is an aluminum or copper plate, with notably higher mass density (2.7 and 8.8 g/cm$^3$, respectively, for Al and Cu) than that of the CNT electrode (~0.7 g/cm$^3$), which in turn adds significant weight to the device.

Another advantage for free-standing electrodes is the ability to adjust the electrode thickness that might lead to performance improvement. For example, in electrochemical double-layer capacitors (EDLC), thinner electrodes having lower resistance provide higher power density. This approach to performance improvement is not feasible with conventional designs due to the relative increase in the mass percent of the current collector.

Other advantages, more specific to the design of particular energy storage devices, are foreseeable. For example, in a battery, elimination of the copper substrate would allow for cycling below 2.5 V (the typical potential where oxidation of the copper substrate initiates), thus increasing the depth of discharge and creating the opportunity to maintain a near-zero volt state-of-charge for prolonged storage. In general, substitution of metal current collectors with the cohesive carbon assembly of the present invention enables entirely new designs for these devices.

The invention is illustrated further by the following examples that are not to be construed as limiting the invention in scope to the specific procedures or products described therein.

EXAMPLES

Example 1

Dispersion of SWCNT in ODCB

A stable dispersion of SWCNT in o-dichlorobenzene (ODCB) was produced as follows:

(1) 600 mg of SWCNT (Thomas Swan "Elicarb SW") were combined with 500 grams of ODCB to provide a first mixture.
(2) The first mixture was mixed and dispersed using a high shear mixer (10,000 rpm) and optional simultaneous sonication in an ultrasonic bath for 30 min in a sealed container to provide a second mixture.
(3) The mixer speed was then reduced to 5,000 rpm, so that the solution was not splashed on the wall of the container. 100 grams of ODCB were added by spraying the wall of the container with a wash bottle, so that no SWCNT remained stuck to the wall of the container. The obtained mixture was mixed at 5000 rpm and optionally in the presence of simultaneous sonication in ultrasonic bath for 10 min to provide a third mixture.
(4) The third mixture in a sealed bottle was sonicated in an ultrasonic bath for 2 hrs at 45° C. after removing the high shear mixer probe, to provide a fourth mixture.
(5) The fourth mixture was a SWCNT-ODCB dispersion ready to be used for coating or casting.

Alternatively, when no sonication was carried out during the mechanical mixing, the third mixture was sonicated in an ultrasonic bath for 1 hour, or 4 hrs at 45° C. to provide a SWCNT-ODCB dispersion.

Example 2

Self Delaminating and Self Standing Cohesive Assembly of SWCNT

Ultrasonically cleaned Petri dishes 9 cm in diameter were used as the molds for casting. The Petri dishes were coated with a hydrophobic coating solution such as is described in U.S. Pat. No. 6,395,331B1 to Yan et al. The hydrophobic coating resulted in a surface having water contact angle ≥80°. Hydrophobic coating on molds was prepared by dip-coating, flow-coating, spin-coating, or spray coating, and then curing (and drying) at 200° C. for 1 hour.

The SWCNT-ODCB dispersion prepared in Example 1 was slowly cast into the hydrophobic coated molds under ambient conditions. Each mold was cast with a different amount of SWCNT-ODCB dispersion so that the dishes contained between 5 mg and 2 grams of SWCNT.

If any dispersed SWCNT adhered to the wall of the mold after casting, about 5 grams of ODCB were sprayed to wash the SWCNT down into the cast SWCNT-ODCB dispersion.

The cast molds were placed in a vacuum oven at room temperature. Vacuum was slowly applied in the oven for 10 minutes so that no bubbles or boiling of the solvent in the mold occurred. A liquid nitrogen vapor trap was placed between the vacuum oven and the pump. Evaporated solvent was collected in the trap. Optionally the molds were covered with Saran Wrap films with pin-holes to control solvent evaporation.

The oven temperature was raised to 30° C. to accelerate the solvent evaporation speed. The solvent was substantially removed from the mold after about 10 hours. The molds were removed from the vacuum oven and heated at 200° C. for 3 hr in a conventional oven, then cooled to ambient temperature.

After substantially removing the solvent by evaporation, free-standing, SWCNT assemblies (wafers) were formed that could be easily lifted out of the molds.

The weight and thickness of the resulting cohesive SWCNT wafers depended on the amount of dispersion initially cast into the mold. For example, three intact SWCNT wafers obtained by the above procedure had weights of 72 mg, 95 mg, and 123 mg with 64 $cm^2$ surface area for each (9 cm diameter). Their respective thicknesses were about 16, 21, and 27 µm.

Example 3

Adherent, Cohesive SWCNT Assemblies on Substrates (Cast)

About 165 mg of the SWCNT-ODCB dispersion prepared according to Example 1 was cast into a Petri dish lined with aluminum foil. The ODCB solvent was removed by evaporation as described in Example 2. An adherent, cohesive SWCNT assembly as a coated film, about 20 µm thick, was formed on the aluminum foil surface. No delamination or loss of adherence was observed after the SWCNT-aluminum article was heated at 300° C. for 4 hrs.

Figure 2:
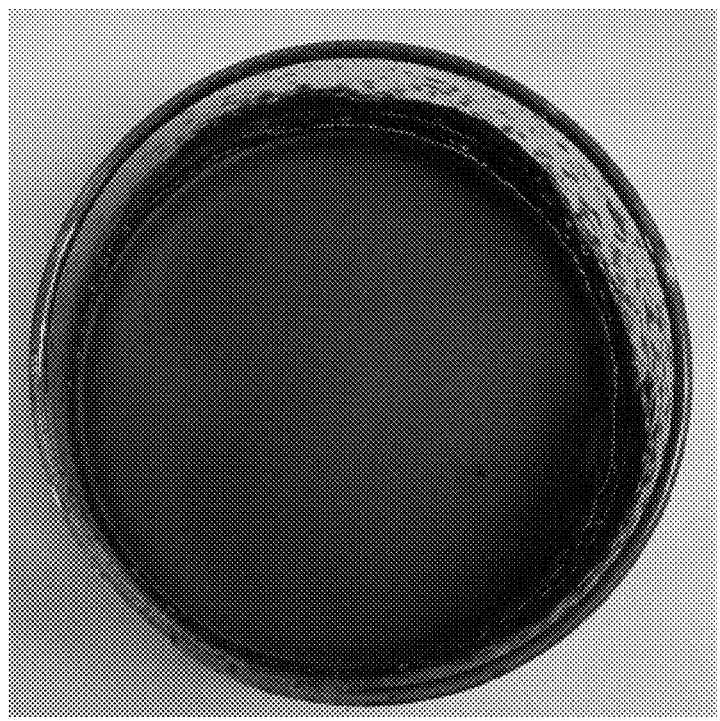
FIG. 2 is an optical image of a cohesive carbon assembly comprising SWCNTs prepared according to Example 3.

About 165 mg of the SWCNT-ODCB dispersion prepared according to Example 1 was also cast into a cleaned glass Petri dish (untreated with hydrophobic coating). The ODCB solvent was removed by evaporation as described in Example 2. An adherent, cohesive SWCNT assembly was formed as a coated film on the glass surface (FIG. 2). No delamination or loss of adherence was observed after the coated glass was heated at 400° C. for 3 hrs, nor when the coated glass was rinsed with a solvent such as acetone, ODCB, or IPA.

The SWCNT assembly in the glass dish was separated from the glass surface by immersing in 20% HF solution for at least 1 minute. It was then rinsed with water and dried in air, resulting in a free-standing cohesive SWCNT assembly.

Example 4

Cohesive SWCNT Assembly on a Substrate (Spin-Coated)

One (1) milliliter of the SWCNT-ODCB dispersion prepared according to Example 1 is spin-coated on a silicon wafer substrate at 500 rpm for 30 sec. The ODCB solvent is removed by evaporating in air for at least 1 minute. A cohesive SWCNT assembly as a coated film is formed on the substrate, having a thickness of about 0.5 µm.

Example 5

Cohesive SWCNT Assembly on a Substrate (Dip-Coated)

The SWCNT-ODCB dispersion prepared according to Example 1 is placed into a rectangular tank at least 6 inches wide, 1 inch deep, and 5 inches high. Sufficient amount of the dispersion is placed into the tank to fill it to within 1 inch of the top. A 4×6 inch sheet of copper, aluminum, or other metallic substrate, or a silicon wafer, is lowered into the tank of
SWCNT-ODCB dispersion. The substrate is then withdrawn vertically from the tank at a speed of 0.2 cm/s. The ODCB solvent is removed by evaporating in air for at least 1 minute. A cohesive SWCNT assembly as a coated film is formed on the substrate, having a thickness of about 5 µm.

Example 6

Cohesive SWCNT Assembly on a Substrate (Spray-Coated)

The SWCNT-ODCB dispersion prepared according to Example 1 is sprayed on an aluminum foil substrate. The ODCB solvent is removed by evaporation in a vacuum oven at 0.25 Torr and 50° C. for at least 10 minutes. A cohesive CNT assembly as a coated film is formed on the substrate, having a thickness of about 50 μm.

Example 7

Characterization of Cohesive Carbon Assembly (I) Electrical Sheet Resistance and Resistivity To be useful as a current collector for such devices as a capacitor, fuel cell, or battery, a material needs to have sufficiently low resistivity (on the order of $10^{-2}$ Ω-cm or below) and sufficient mechanical robustness (high tensile strength and resistance to breakage).

To establish that the cohesive assemblies have sufficiently low resistivity to be used as current collectors, assemblies prepared according to Examples 2 and 3 were measured for electrical sheet resistance and resistivity as follows:

From each assembly, a sample of rectangular or square geometry was cut with lengths greater than 1 cm on all sides. Each sample was mounted in a sample mount, and two electrical contact pairs (two current carrying and two voltage sensing) were directly compressed to the sample, in a standard Kelvin-type (4-point) probe configuration. The sample was positioned such that the four metal tips of the four-point probe made direct contact with the sample without puncturing through it.

A constant current of 1 mA was made to flow the length of the sample by using a high impedance current source. The voltage drop across the sample was measured using a high impedance digital voltmeter. The surface (sheet) resistance, $R_s$ in Ω (or Ω/sq), of the sample was determined from the ratio of the stable voltage registering on the voltmeter, V, to the value of the output current of the current source, I, multiplied by the geometric factor $\pi/\ln 2 \approx 4.53$:

$$R_s = 4.53 \, (V/I).$$

The thickness (t) of each sample was measured using a profilometer, digital micrometer, or scanning electron microscope, and the electrical resistivity ρ of each sample in Ω-cm, was then calculated using the formula:

$$\rho = R_s(t)$$

Sheet resistances of SWCNT assemblies prepared according to Examples 2 and 3 were between 8 and 17 Ω per square.

Resistivities of cohesive carbon assemblies prepared according to Examples 2 and 3 were between about 0.02 and 0.05 Ω-cm.

Resistivities of the SWCNT assemblies were sufficiently low such that they could be utilized as current collectors in electronic storage devices such as capacitors, fuel cells, or batteries. Moreover, cohesive assemblies fabricated with the present invention possess the necessary mechanical properties to be used as current collectors, replacing current collectors made from metals such as aluminum or copper. This is in direct contrast to other types of carbon assemblies, including, for example, activated carbon, and other CNT-based assemblies such as those made from CNT forests, which do not possess the necessary robustness to be used as current collectors in place of metal plates.

(II) Raman Spectrum

Figure 3:
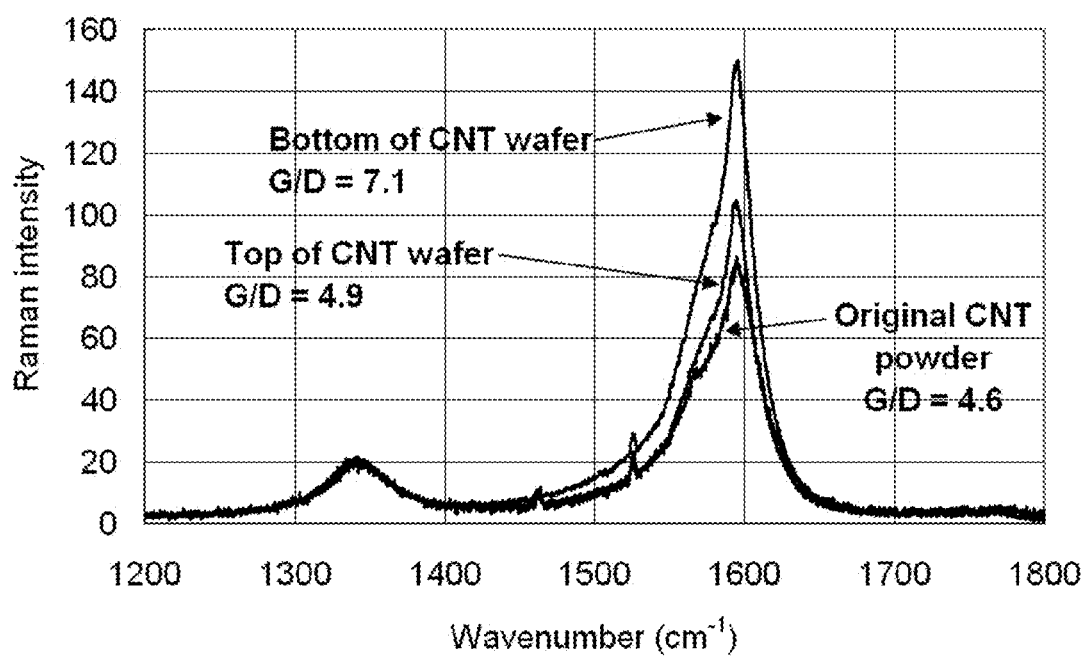
FIG. 3 is a chart showing Raman spectra of as-received SWCNT powder, and the top side and bottom side of a cohesive carbon assembly comprising SWCNTs.
Figure 4:
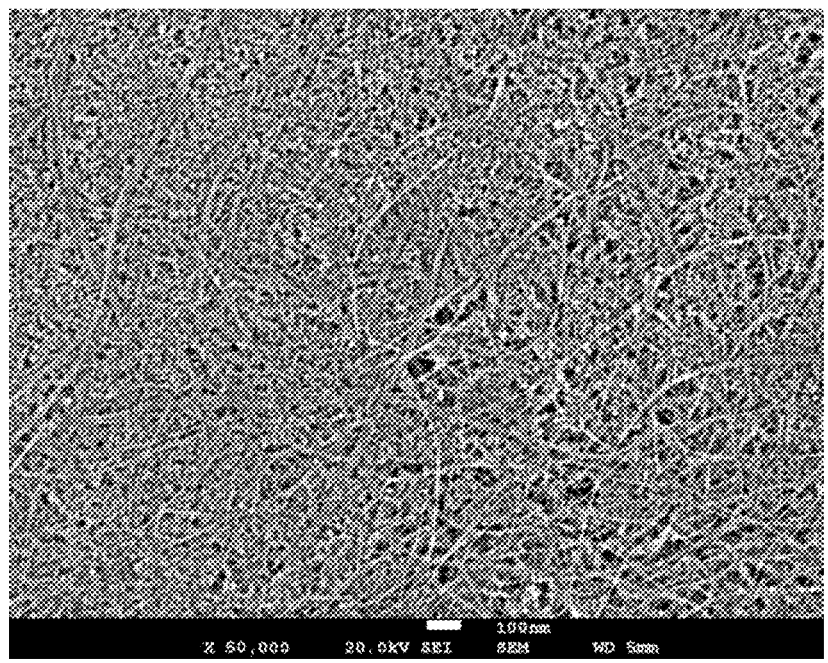
FIG. 4 is a set of two scanning electron microscope (SEM) images showing a top view (top) and a cross-sectional view bottom of a cohesive carbon assembly comprising SWCNTs.
Figure 4:
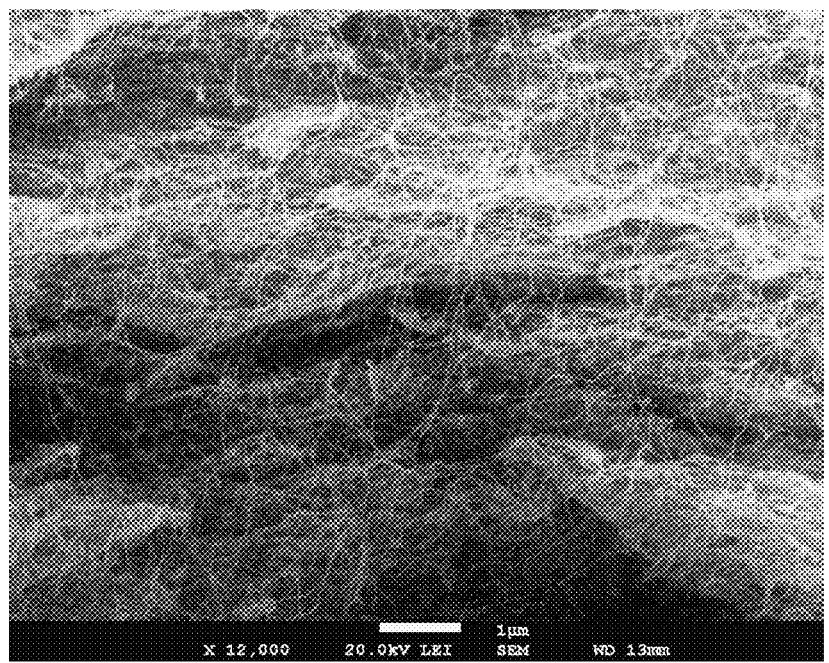

SWCNT assembly prepared according to Examples 2 and the corresponding carbon starting material were characterized by Raman spectrum using a standard method. The SWCNT wafer showed improved Raman G/D ratio of 4.9 on the top surface and 7.1 on the bottom side of the wafer compared to that of the carbon starting material (as received CNT powder, Raman G/D ratio 4.6) (FIG. 3). This suggests that the ratio of carbon nanotubes to other forms of carbon such as amorphous carbon was somewhat higher, and/or that the concentration of defects in carbon nanotubes was somewhat lower, towards the bottom of the assembly.

(III) Scanning Electron Microscopy (SEM) Imaging

SWCNT assemblies prepared according to Examples 2 and 3 were imaged and characterized by SEM (JSM-7500F, JEOL Ltd., Tokyo). The images showed that the SWCNT assemblies obtained formed a structure of inter-woven nanotubes during the solvent evaporation process and preserved the nanotube aspect ratio of length to diameter.

Example 8

Capacitor Electrode Comprising a Cohesive Assembly of SWCNT

Cohesive carbon assemblies were prepared following the procedure described in Example 2. The SWCNT assemblies were about 9 cm in diameter and about 20-35 μm thick (measured using a profilometer, model Dektak 150, Veeco Instruments Inc., Plainview, N.Y.). Discs about 0.625 inch in diameter were cut from the assemblies using a standard laboratory blade.

Some of the discs were placed in a sealed quartz tube inside a furnace at room temperature (about 20° C.). The tube was purged for one hour by flowing helium through it at 20 sccm. The discs were then heated in the furnace at 10° C./minute to 1000° C. while continuing the flow of helium. While holding the temperature at 1000° C., helium flow was stopped, and a mixture of 5% chlorine and 95% argon gas was introduced at 20 sccm. These conditions were maintained for 1 hour, then the gas was switched back to helium at 20 sccm for 30 minutes. The gas was then changed to a mixture of 5% hydrogen and 95% argon at 20 sccm for 30 minutes to remove residual chlorine. Then, the gas was switched back to 20 sccm helium and maintained for 2 hours. The furnace was then cooled naturally to room temperature.

The discs treated with chlorine as above, and some non-treated discs, were then dried under vacuum at 195° C. for 12 hours immediately prior to further use.

For comparison with the SWCNT discs, Activated Carbon (AC) with the product name Norit DLC Super 30 was obtained from Norit Nederland BV (Amersfoort, The Netherlands). A disc-shaped piece about 0.625 inch in diameter and between 40 and 60 μm thick was formed from the AC powder using standard manufacturing methods. The AC disc was dried at 60° C. for 1 hour immediately prior to further use.

Electrochemical double-layer capacitor (EDLC) cells were fabricated using the SWCNT and AC discs. Prototype cells were assembled in a dry box using metal plates clamped against each electrode face as current collectors. The cells were tested for their properties and performance as electrodes in symmetric electrochemical capacitors rated at 2.0 volts, using 1.0M tetraethylammonium tetrafluoroborate (TEATFB) salt in propylene carbonate as the electrolyte.

Test capacitor cells were conditioned by holding them at 2.0 V for ten minutes, then charge/discharge cycled using a battery/capacitor tester (Model BT2000, Arbin Instruments, College Station, Tex.) thirty times between 1.0 and 2.0 V using 2.5 mA current. Then, electrical performance measurements were made in the following order:

1. Leakage current after 30 minutes at 1.0, 1.5, and 2.0 V
2. EIS (electrochemical impedance spectroscopy) measurements at 2.0 V bias voltage
3. Constant-current and constant-power charge/discharge measurements using the Arbin tester Representative results of the above measurements are summarized in Table 1.

Equivalent series resistances (ESR) of all cells were comparable.

The 30 minute leakage current of cells fabricated with electrodes made from both non-treated and $Cl_2$-treated SWCNT assemblies was superior (i.e. lower) compared to that of the cell fabricated with AC electrodes. Chlorine-treated SWCNT cells showed slightly better leakage current compared to non-$Cl_2$-treated cells, but the difference might be statistically insignificant. The much lower leakage current of the SWCNT cells suggests that they may be operated at substantially higher voltages compared to AC-based cells.

The SWCNT cells exhibited very high discharge rate, with full capacitance discharge times on the order of about 0.3-0.4 seconds, or less, which was retained up to 5 A/g current, compared to about 2-3 seconds for the AC cell. Furthermore, the AC cell did not retain full capacitance to this same current level. This indicates that the SWCNT cells showed superior power performance compared to the AC cell.

Power density of the SWCNT cells was estimated to be at least 100 kW/kg. This is superior to the power density of typical commercial AC-based EDLCs, which is about 10 kW/kg or less, and is at least equivalent to the power performance of any currently available commercial EDLC.

TABLE 1

Performance of Capacitor Cells Utilizing SWCNT Electrodes of the Present Invention, Compared to Activated Carbon Electrode.

| Cell ID and Type | ESR (Ω) | 30 minute leakage current (µA) | | | Discharge Time (sec) | Power Density (kW/kg) | EIS Frequency for 45° phase angle (Hz) |
| --- | --- | --- | --- | --- | --- | --- | --- |
| | | 1.0 V | 1.5 V | 2.0 V | | | |
| 1 (No $Cl_2$) | 0.64 | 1.6 | 2.3 | 5.1 | 0.3-0.4* | >100# | 2.7 |
| 2 (No $Cl_2$) | 0.63 | 1.5 | 2.4 | 4.9 | | | 2.2 |
| 3 ($Cl_2$ treated) | 0.50 | 0.8 | 1.6 | 4.0 | | | 2.9 |
| 4 ($Cl_2$ treated) | 0.51 | 0.7 | 1.2 | 3.8 | | | 2.3 |
| 5 ($Cl_2$ treated) | 0.72 | 0.6 | 1.3 | 3.5 | | | 2.0 |
| AC | 0.54 | 3.9 | 7.3 | 33.1 | ~2-3 | ~10 | 0.4-0.5 |

*Minimum measurable full capacitance discharge time under the test conditions; actual time is lower.
Maximum measurable power density under the test conditions; actual power density is higher.

Due to limitations within the test, absolute full capacitance discharge time and power density of the SWCNT cells could not be determined. For these two parameters, the SWCNT cells showed power performance in excess of the measurement capability of the test equipment.

Another strong indicator of pulse power performance of a capacitor device is the frequency at which the complex impedance phase angle reaches 45°. A higher frequency indicates better performance. Capacitors fabricated from SWCNT electrodes showed 45° phase angle frequency of 2.0-2.9 Hz, whereas the capacitor based on AC showed 45° phase angle frequency of 0.5 Hz. For this performance metric, $Cl_2$-treated and non-treated SWCNT cells performed similarly.

Overall, SWCNT electrodes of the present invention out-performed commercial activated carbon currently used as the standard electrode material in EDLC devices, in terms of pulse power performance.

Example 9

Battery Electrode Comprising a Cohesive Assembly of SWCNT

A cohesive carbon assembly is prepared following the procedure described in Example 2. The SWCNT assembly is about 9 cm in diameter and about 40 to 60 µm thick.

A section of appropriate size and shape is cut from the assembly and tested for its performance as an anode in a lithium-ion battery, using the method described by Y. NuLi in *Materials Letters* 62 (2008) 2092-2095.

The test method consists of the following essential steps: (1) the cohesive SWCNT assembly is installed in a test battery cell, (2) the cell is discharged, and (3) the power and energy densities from the discharge curves are measured.

Then, the data for the cell with the SWCNT anode is compared with the same data obtained from a sampling of similar cells having other types of anode materials. The performance of the SWCNT assembly-based lithium-ion battery anode is thereby compared to the performance of lithium-ion battery anodes composed of other materials such as graphite, hard carbon (i.e. diamond-like carbon), titanate, silicon, germanium, other CNT-based electrodes that require binder or structural support, and the like.

Example 10

Fuel Cell Electrode Comprising a Cohesive Assembly of SWCNT

A cohesive carbon assembly is prepared following the procedure described in Example 2. The SWCNT assembly is about 9 cm in diameter and about 40 to 60 µm thick (measured by profilometer).

A piece of the SWCNT assembly is analyzed by nitrogen adsorption/desorption using a model TriStar 3000 equipment manufactured by Micromeritics Instrument Corp., Norcross, Ga. The assembly has a BET surface area of 1680 $m^2/g$, and a total desorption pore volume of 1.75 $cm^3/g$. The density of the assembly is determined to be about 0.5 $g/cm^3$ by dimensional and weight measurements. The porosity of the assembly is thereby calculated as about 88%.

A section of appropriate size and shape is cut from the assembly and the section is then coated with platinum metal particles according to a method described in US Patent Application Publication US 2009/0015984A1.

The Pt-coated section of SWCNT assembly is evaluated for its performance as a fuel cell electrode, using the method described by B. Fang et al, *Electrochemistry Communications* 11 (2009) 1139-1141. The cell voltage and power density vs. current density behavior of the fuel cell containing the SWCNT assembly-based electrode, is then compared to the performance of standard fuel cells containing carbon black, carbon paper, and/or carbon cloth-based electrodes, and to the performance of fuel cells containing other potential alternative electrode materials.

Example 11

Self Standing Cohesive Assembly of SWCNT from Toluene Dispersion

A dispersion of SWCNT in a liquid solvent was prepared in a similar way as described in Example 1 (steps 1 through 4), except toluene was used as the dispersing solvent in place of ODCB, and 250 mg of SWCNT were dispersed in 217.5 g (about 250 ml) of toluene. The resulting mixture was a stable SWCNT-toluene dispersion ready to be used for coating or casting.

Figure 5:
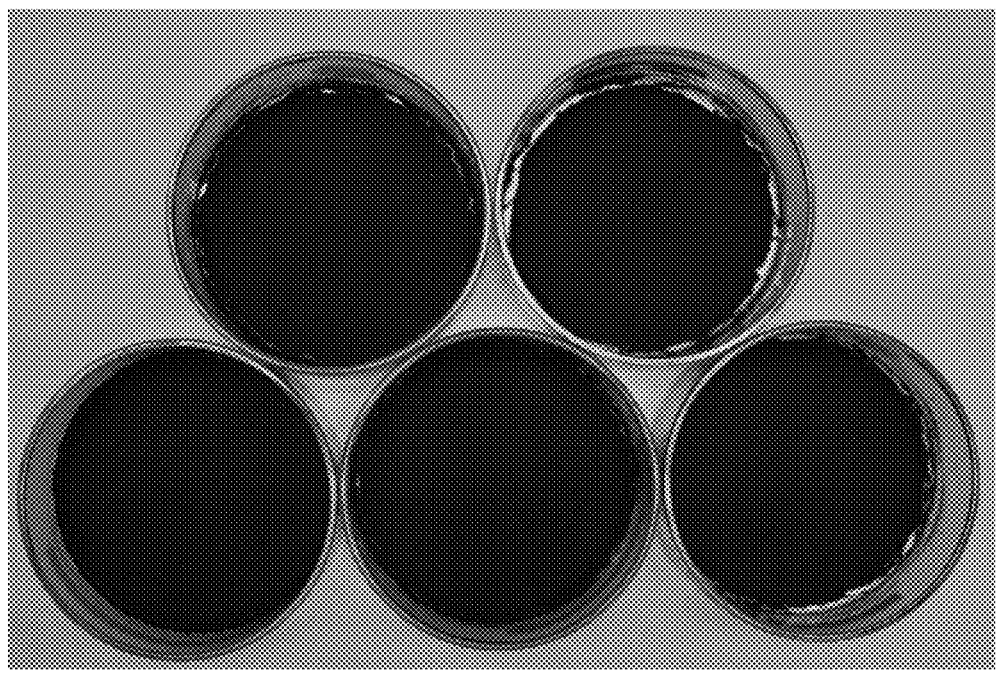
FIG. 5 is an optical image of a set of five self-delaminating and self-standing cohesive assemblies comprising SWCNTs, 9 cm in diameter, prepared according to Example 11.
Figure 6:
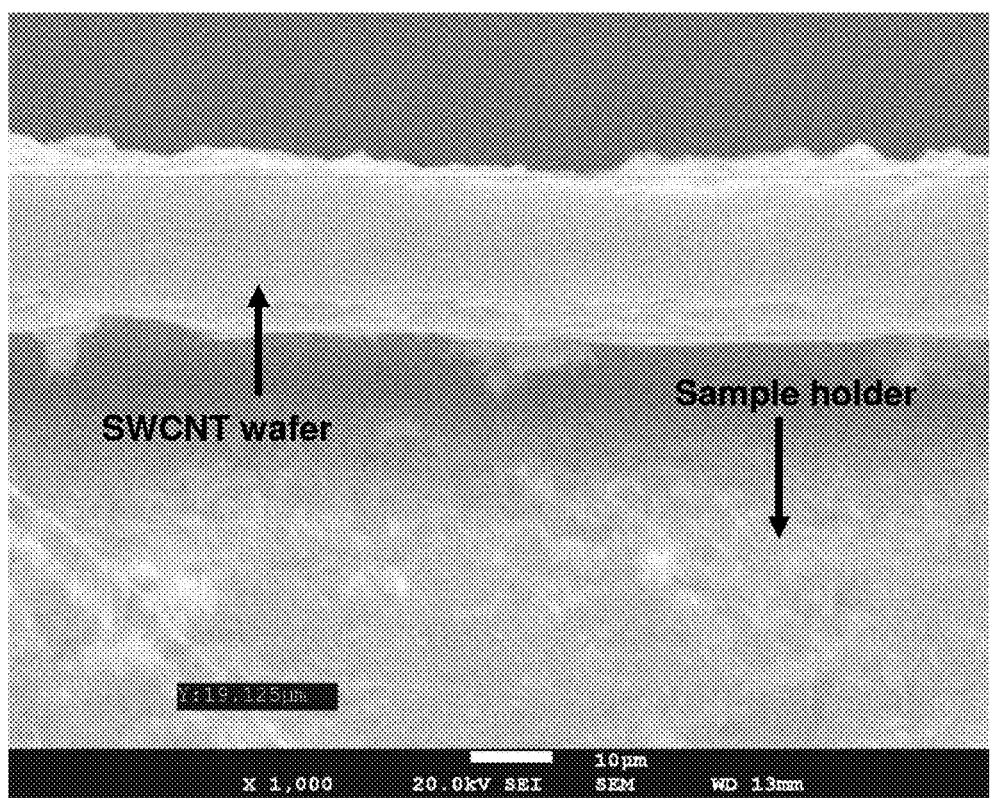
FIG. 6 is a SEM image showing a cross-sectional view of a self-standing cohesive assembly of SWCNTs prepared according to Example 11.

About 43.5 g (50 ml) each of the SWCNT-toluene dispersion were slowly cast into five 9-cm diameter Petri dishes, which had previously been treated with a hydrophobic solution as described in U.S. Pat. No. 6,395,331B1. Toluene was removed by evaporation in a vacuum oven (at a pressure of ~0.25 Torr or less) at 50° C. for about 6 hrs. The petri dishes containing the dried SWCNT were then removed from the vacuum oven, and heated at 200° C. for 3 hrs in a conventional oven, and then cooled to ambient temperature. Five cohesive, free standing SWCNT wafers were obtained (FIG. 5). The wafers could be easily removed from the dishes, showing no adherence to the glass surface. The thickness of each wafer was about 19 µm, as determined by SEM cross-sectional measurements (FIG. 6).

Example 12

Cohesive Adherent Film of SWCNT on Aluminum from Toluene Suspension

Figure 7:
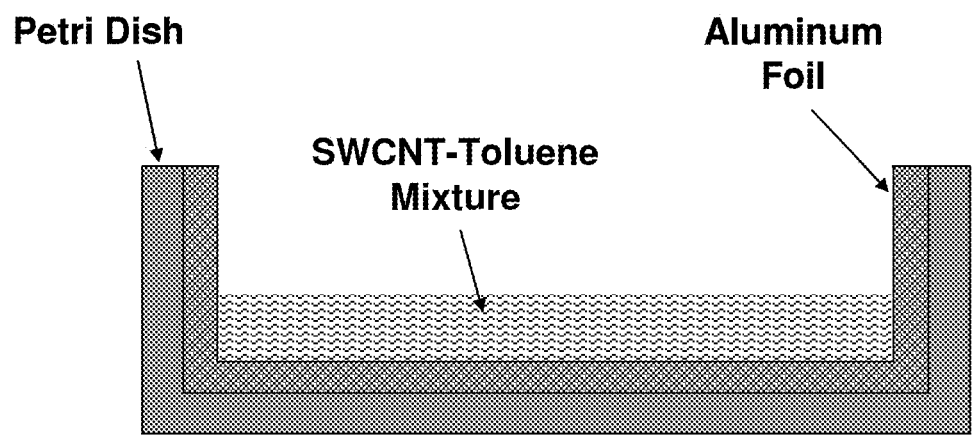
FIG. 7 is a schematic diagram showing the method for producing a cohesive, adherent film comprising SWCNT on an aluminum substrate.

A dispersion of SWCNT in toluene was prepared as described in Example 11. Aluminum foil with a thickness of about 25 µm was rinsed with acetone and dried with a stream of dry nitrogen gas to remove any surface contaminants. A piece of foil large enough to cover the bottom and sides of a 9-cm Petri dish was placed inside such a dish with the shinier side face-up. The foil was shaped by hand by pressing it against the bottom and sides of the dish to create a foil lining inside the dish. A second dish was similarly lined with foil. About 43.5 g (50 ml) each of the SWCNT-toluene dispersion were slowly cast into the two aluminum foil-lined Petri dishes (FIG. 7).

Figure 8:
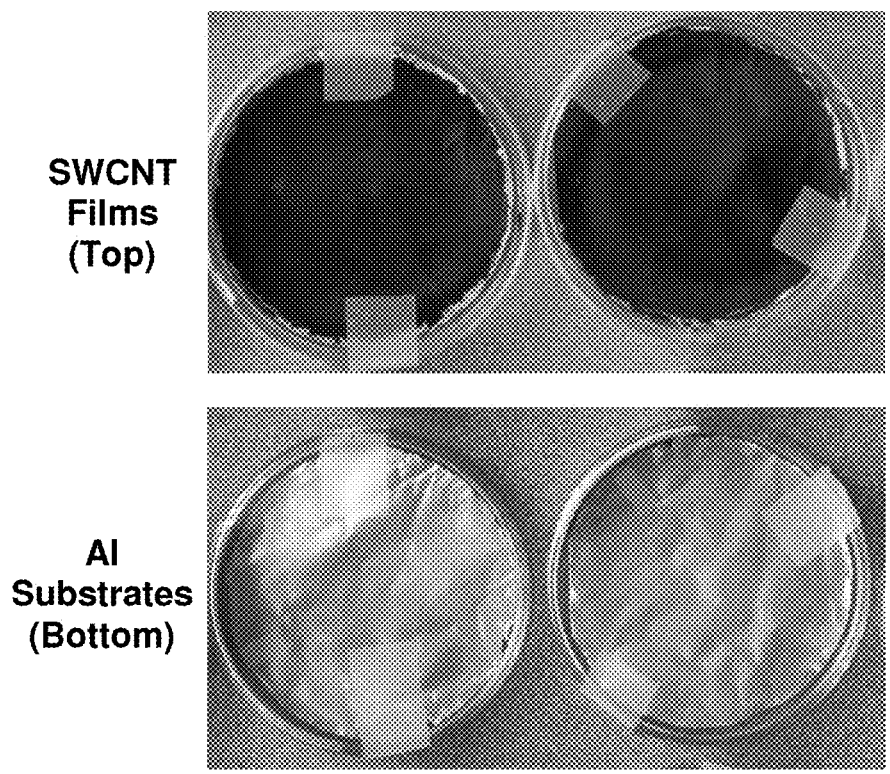
FIG. 8 is a pair of optical images showing two cohesive, adherent, SWCNT films on aluminum foil substrates, each 9 cm in diameter. The top image shows the SWCNT films. The bottom image shows the aluminum foil substrates.
Figure 9:
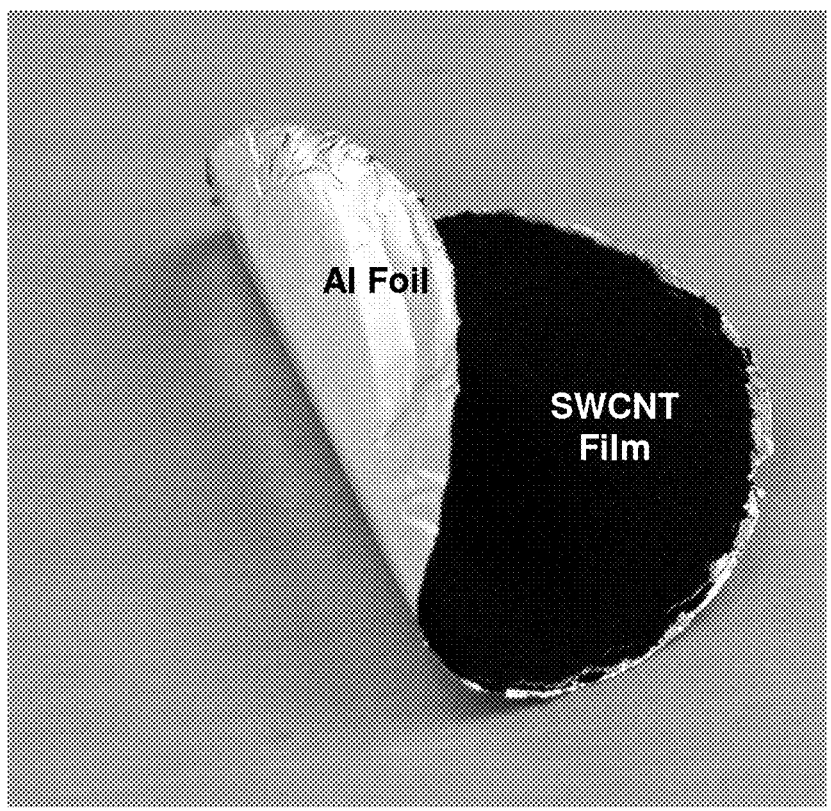
FIG. 9 is an optical image of a cohesive, adherent SWCNT film, 9 cm in diameter, on an aluminum foil substrate, showing the SWCNT film on one side and the aluminum substrate on the other side.

After removing toluene by evaporation in a vacuum oven (at a pressure of ~0.25 Torr or less) for about 6 hrs at 50° C., cohesive SWCNT films were formed that adhered to the aluminum foil. The films did not delaminate from the foil either after drying, or after heating the films at 500° C. for 1 hr in ultra-high purity argon (<2 ppm oxygen). FIG. 8 shows the cohesive, adherent SWCNT films formed on aluminum foil substrates. FIG. 9 shows a single cohesive, adherent SWCNT film on an aluminum foil substrate, deformed so that both sides are visible. The film did not delaminate or lose adherence after deforming.

Example 13

Electrochemical Impedance Spectroscopy of Cohesive SWCNT Assemblies

Electrochemical Impedance Spectroscopy (EIS) measurements were performed on two cohesive SWCNT assemblies (wafers). One was an adherent SWCNT wafer on an aluminum (Al) substrate, prepared as described in Example 12. The other was a free standing SWCNT wafer prepared as described in WO 2010/102250, using bromine as the dispersion solvent, which was subsequently bonded to an Al current collector using a standard industrial method. Both SWCNT wafers had a similar thickness of 16.5±1.5 µm.

Figure 10:
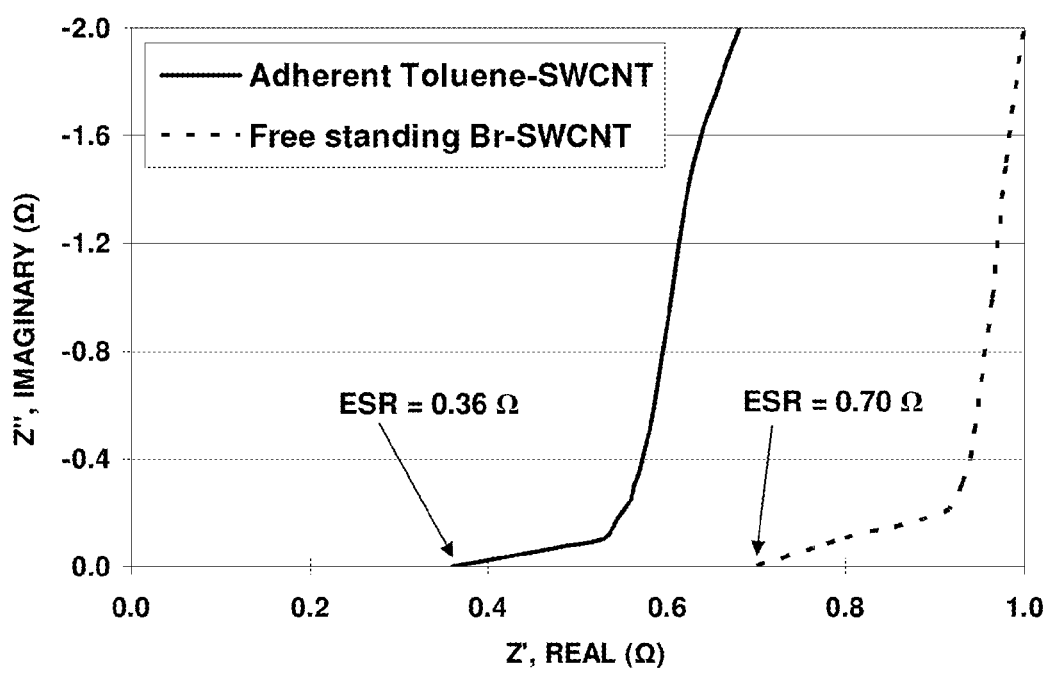
FIG. 10 is a chart showing plots of imaginary impedance versus real impedance (known as Nyquist plots), for an adherent cohesive SWCNT assembly formed on aluminum foil, and a free-standing cohesive SWCNT assembly.

The EIS measurements were conducted at a DC bias of 2V with a sinusoidal signal over a frequency range from 10 mHz to 0.1 MHz. The results were displayed on Nyquist plots of imaginary impedance (Z") vs. real impedance (Z'), shown in FIG. 10. In a typical Nyquist plot, the minimum Z' value (at the bottom left of each data curve) represents the equivalent series resistance (ESR) of the device. The ESR is the result of the combination of the contact resistance of the SWCNT-Al interface, the bulk resistance of the electrolyte solution, and the resistance of Al itself.

Assuming the latter two contributions to ESR are approximately the same for two devices of similar design and configuration, the difference in ESR represents the difference in contact resistance of the SWCNT-Al interface between the two devices.

The adherent SWCNT wafer on Al showed a significantly lower ESR of 0.36 Ω, compared to ESR of 0.70 Ω for the free standing SWCNT wafer bonded to aluminum. This example demonstrates the clear advantage of applying adherent cohesive SWCNT (or other carbon) assemblies directly to aluminum (or other metal) substrates, rather than producing free standing assemblies and then bonding them to the metal. Namely, contact resistance between the assembly and the substrate was reduced by fabricating the adherent assembly directly on the metal substrate.

Although several embodiments of the invention have been described in the Examples given above, those of ordinary skill in the art will appreciate that various modifications can be made without departing from the scope of the invention. Accordingly, other embodiments are within the scope of the following claims.

What is claimed:

1. A method of preparing a cohesive carbon assembly comprising:
   (a) obtaining a carbon starting material in the form of powder, particles, flakes, or loose agglomerates,
   (b) dispersing the carbon starting material in an organic solvent comprising toluene, o-dichlorobenzene (ODCB), isopropyl alcohol (IPA), N,N-dimethylformamide (DMF), benzene, chlorobenzene, m-dichlorobenzene, 1,2,4-trichlorobenzene, bromobenzene, m-dibromobenzene, o-dibromobenzene, o-xylene, m-xylene, p-xylene, 1,2-dichloroethane, 1,2-dibromoethane, chloroform, formamide, N-methylformamide, N-vinylformamide, N-(phenethyl)formamide, N,N-diethylformamide, N,N-bis(1-methylethyl)formamide, dimethyl sulfoxide, or any combination thereof, in a prescribed ratio to form a dispersion,
   (c) applying the dispersion to a hydrophobic surface, and
   (d) substantially removing the organic solvent in a controlled manner to form a cohesive carbon assembly on the hydrophobic surface, wherein the hydrophobic surface comprises a dimethyl organosilane, a fluorinated dimethyl organosilane, a fluorinated polymer, or Teflon.

2. A method of preparing a cohesive carbon assembly comprising:
   (a) obtaining a carbon starting material in the form of powder, particles, flakes, or loose agglomerates,
   (b) dispersing the carbon starting material in an organic solvent comprising toluene, o-dichlorobenzene (ODCB), isopropyl alcohol (IPA), N,N-dimethylformamide (DMF), benzene, chlorobenzene, m-dichlorobenzene, 1,2,4-trichlorobenzene, bromobenzene, m-dibromobenzene, o-dibromobenzene, o-xylene, m-xylene, p-xylene, 1,2-dichloroethane, 1,2-dibromoethane, chloroform, formamide, N-methylformamide, N-vinylformamide, N-(phenethyl)formamide, N,N-diethylformamide, N,N-bis(1-methylethyl)formamide, dimethyl sulfoxide, or any combination thereof, in a prescribed ratio to form a dispersion, (c) applying the dispersion to a hydrophobic surface, and
(d) substantially removing the organic solvent in a controlled manner to form a cohesive carbon assembly on the hydrophobic surface, wherein the dispersion is applied to the hydrophobic surface by casting.

3. A method of preparing a cohesive carbon assembly comprising:
(a) obtaining a carbon starting material in the form of powder, particles, flakes, or loose agglomerates;
(b) dispersing the carbon starting material in an organic solvent comprising toluene, o-dichlorobenzene (ODCB), isopropyl alcohol (IPA), N,N-dimethylformamide (DMF), benzene, chlorobenzene, m-dichlorobenzene, 1,2,4-trichlorobenzene, bromobenzene, m-dibromobenzene, o-dibromobenzene, o-xylene, m-xylene, p-xylene, 1,2-dichloroethane, 1,2-dibromoethane, chloroform, formamide, N-methylformamide, N-vinylformamide, N-(phenethyl)formamide, N,N-diethylformamide, N,N-bis(1-methylethyl) formamide, dimethyl sulfoxide, or any combination thereof in a prescribed ratio to form a dispersion;
(c) applying the dispersion to a hydrophilic surface; and
(d) substantially removing the organic solvent in a controlled manner to form a cohesive carbon assembly on the hydrophilic surface.

4. The method of claim 3, wherein the hydrophilic surface is selected from the group consisting of metal, glass, silicon, plastic, ceramic, and any combinations thereof.

5. The method of claim 3, wherein the hydrophilic surface is a metal substrate selected from the group consisting of aluminum, nickel, copper, gold, silver, platinum, and any combination thereof.

6. The method of claim 3, wherein the dispersion is applied to the hydrophilic surface by spin-coating, dip-coating, flow-coating, spray coating, casting, or any combination thereof.

7. A cohesive carbon assembly on a metal substrate prepared by the method of claim 5.

8. The cohesive carbon assembly on a metal substrate of claim 7, wherein the carbon starting material is carbon nanotubes, and the organic solvent is o-dichlorobenzene, toluene, IPA, DMF, or any combination thereof.

9. The method of claim 3, wherein the carbon starting material is a carbon material selected from the group consisting of carbon nanotubes, graphene, graphite, expanded graphite, exfoliated graphite, amorphous carbon, and any combination thereof.

10. The method of claim 9, wherein the carbon nanotubes are single-walled carbon nanotubes, double-walled carbon nanotubes, multi-walled carbon nanotubes, or any combination thereof.

11. The method of claim 10, wherein the Raman G/D ratio of the formed cohesive carbon assembly is about the same or greater than the Raman G/D ratio of the carbon starting material.

12. The method of claim 3, wherein the organic solvent is toluene, ODCB, IPA, DMF, or any combination thereof.

13. The method of claim 3, wherein the carbon starting material is dispersed in the organic solvent in the presence of mechanical agitation in step (b).

14. The method of claim 13, wherein the mechanical agitation comprises sonication, mechanical stirring, or a combination thereof.

15. The method of claim 3, wherein the carbon starting material is single-walled carbon nanotubes, the organic solvent is toluene, ODCB, IPA, DMF, or any combination thereof, and the ratio of carbon starting material and the organic solvent is about 0.1 to about 20 mg carbon per gram of the organic solvent.

16. The method of claim 3, wherein the organic solvent is substantially free of a binding material.

17. The method of claim 3, further comprising collecting the removed organic solvent.

18. The method of claim 1, wherein the carbon starting material is a carbon material selected from the group consisting of carbon nanotubes, graphene, graphite, expanded graphite, exfoliated graphite, amorphous carbon, and any combination thereof.

19. The method of claim 18, wherein the carbon nanotubes are single-walled carbon nanotubes, double-walled carbon nanotubes, multi-walled carbon nanotubes, or any combination thereof.

20. The method of claim 19, wherein the Raman G/D ratio of the formed cohesive carbon assembly is about the same or greater than the Raman G/D ratio of the carbon starting material.

21. The method of claim 1, wherein the organic solvent is toluene, ODCB, IPA, DMF, or any combination thereof.

22. The method of claim 1, wherein the carbon starting material is dispersed in the organic solvent in the presence of mechanical agitation in step (b).

23. The method of claim 1, wherein the mechanical agitation comprises sonication, mechanical stirring, or a combination thereof.

24. The method of claim 1, wherein the carbon starting material is single-walled carbon nanotubes, the organic solvent is toluene, ODCB, IPA, DMF, or any combination thereof, and the ratio of carbon starting material and the organic solvent is about 0.1 to about 20 mg carbon per gram of the organic solvent.

25. The method of claim 1, wherein the organic solvent is substantially free of a binding material.

26. The method of claim 2, wherein the carbon starting material is a carbon material selected from the group consisting of carbon nanotubes, graphene, graphite, expanded graphite, exfoliated graphite, amorphous carbon, and any combination thereof.

27. The method of claim 26, wherein the carbon nanotubes are single-walled carbon nanotubes, double-walled carbon nanotubes, multi-walled carbon nanotubes, or any combination thereof.

28. The method of claim 27, wherein the Raman G/D ratio of the formed cohesive carbon assembly is about the same or greater than the Raman G/D ratio of the carbon starting material.

29. The method of claim 2, wherein the organic solvent is toluene, ODCB, IPA, DMF, or any combination thereof.

30. The method of claim 2, wherein the carbon starting material is dispersed in the organic solvent in the presence of mechanical agitation in step (b).

31. The method of claim 30, wherein the mechanical agitation comprises sonication, mechanical stirring, or a combination thereof.

32. The method of claim 2, wherein the carbon starting material is single-walled carbon nanotubes, the organic solvent is toluene, ODCB, IPA, DMF, or any combination thereof, and the ratio of carbon starting material and the organic solvent is about 0.1 to about 20 mg carbon per gram of the organic solvent.

33. The method of claim 2, wherein the organic solvent is substantially free of a binding material.

* * * * *